(12) United States Patent
Yamashita et al.

(10) Patent No.: US 7,471,465 B2
(45) Date of Patent: Dec. 30, 2008

(54) OPTICAL APPARATUS

(75) Inventors: Tatsumaro Yamashita, Miyagi-ken (JP); Eiki Matsuo, Nagano-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 12/015,961

(22) Filed: Jan. 17, 2008

(65) Prior Publication Data
US 2008/0130128 A1 Jun. 5, 2008

Related U.S. Application Data

(63) Continuation of application No. PCT/JP2006/314247, filed on Jul. 19, 2006.

(30) Foreign Application Priority Data
Jul. 20, 2005 (JP) ............... 2005-210513

(51) Int. Cl.
G02B 9/60 (2006.01)
(52) U.S. Cl. ............ 359/770; 359/649; 359/651; 359/713; 359/714; 359/715; 359/716; 359/740; 359/761; 359/762; 359/781; 359/782; 359/783; 359/790
(58) Field of Classification Search ......... 359/649–651, 359/713–716, 740, 761–762, 770, 781–783, 359/790
See application file for complete search history.

(56) References Cited
U.S. PATENT DOCUMENTS
5,734,511 A 3/1998 Braat (Continued)

FOREIGN PATENT DOCUMENTS
JP 2-77712 3/1990

(Continued)

OTHER PUBLICATIONS
International Search Report dated Oct. 31, 2006 from corresponding International Application No. PCT/JP2006/314247.

*Primary Examiner*—Evelyn A. Lester
(74) *Attorney, Agent, or Firm*—Beyer Law Group LLP

(57) ABSTRACT

To provide a high-brightness, small, low-cost optical apparatus which covers a wide-angle to super-wide-angle region and which reliably corrects various aberrations with a small number of lenses.

At least one negative lens unit 1, a meniscus lens 2 that is convex on an object side, an aperture stop S, and a double-convex positive lens 3 are arranged in order from the object side. At least one of the lenses positioned on the object side of the aperture stop S and the positive lens 3 include respective aspherical surfaces. When va is an average Abbe number of all of the lenses excluding the meniscus lens, vb is an Abbe number of the meniscus lens, f is a focal length of the entire system, f12 is a combined focal length of the negative lens unit and the meniscus lens, ts is a distance between the aperture stop and the positive lens along an axis, L is a distance between a vertex of a lens surface nearest to the object side and a vertex of a lens surface nearest to the image side, t2 is a central thickness of the meniscus lens, θs is an incident angle of a chief ray that passes through the aperture stop at a maximum angle of view, 1.4<va/vb, 0<ts/L<0.1, 0.2<t2/L<0.5, −10<f12/f<−1.0, and 25°<θs<40° are satisfied.

10 Claims, 9 Drawing Sheets

U.S. PATENT DOCUMENTS 7,199,947 B2 * 4/2007 Wang et al. .................. 359/754

FOREIGN PATENT DOCUMENTS

| JP | 7-72382 | 3/1995 |
| JP | 9-21947 | 1/1997 |
| JP | 9-503600 | 4/1997 |
| JP | 2002-72085 | 3/2002 |

* cited by examiner (A) FIELD CURVATURE (B) DISTORTION (A) FIELD CURVATURE
(B) DISTORTION

OPTICAL APPARATUS

CROSS REFERENCE TO RELATED APPLICATION

This is a continuation of International Application No. PCT/JP2006/314247, filed Jul. 19, 2006, which is incorporated herein by reference in its entirety.

TECHNICAL FIELD

The present invention relates to an optical apparatus capable of forming an image of an object on a light receiving plane at a wide angle.

BACKGROUND ART

Wide-angle lenses for capturing a wide field of view are used in the field of on-vehicle cameras and surveillance cameras. In addition, progress in image processing techniques has made it possible to correct distortion of images in real time, and there have been increasing demands for super-wide-angle lenses having a still wider field of view. In particular, in accordance with the problems of installation space, increase in the resolution of picture elements, and applications in various fields, there have been demands for small, high-resolution, and low-cost optical apparatuses.

Such an optical apparatus is required to satisfy the following requirements:
  low cost (small number of lenses, use of resin, formability, assemblability)
  bright (small Fno)
  small (overall length, lens diameter)
  wide field of view (a large angle of view that exceeds 180 degrees depending on the case)
  high resolution (suitable correction of basic aberrations)
  projection method selected as necessary (central projection, conformal projection, stereographic projection, etc.)

If an optical apparatus with a small number of elements that satisfies the above-described requirements can be obtained, such an optical apparatus can be applied to various fields.

FIG. 16 shows an optical apparatus described in Patent Document 1 mentioned below. This optical apparatus is a basic wide-angle lens in which the angle of field is increased by a negative lens positioned at an object side and an image is formed on an image pickup device by a positive lens. This optical apparatus is constituted by a minimum number of lenses, and has a two-lens structure including a negative lens and a positive lens. However, the two-lens structure has, of course, a limited degree of design freedom, and it is difficult to increase the resolution or set an arbitrary projection method. Therefore, the application of this optical apparatus is limited.

FIG. 17 shows an optical apparatus described in Patent Document 2 mentioned below. This optical apparatus is an example of a typical wide-angle lens in which a plurality of concave lenses are disposed on the object side of an aperture stop and concave, convex, and convex are disposed on an image side of the aperture stop. In this optical apparatus, aberrations are corrected and a projection method is set using multiple lenses. Therefore, although there is a relatively large degree of design freedom, it is difficult to reduce the number of lenses because the basic structure of the lens unit on the image side of the aperture stop is determined.

FIG. 18 shows an optical apparatus described in Patent Document 3. This optical apparatus includes a concave lens, a meniscus lens, and a double-convex lens arranged in that order from the object side, and is characterized in that the second lens from the object side is a thick negative meniscus lens with a small Abbe number. The lateral chromatic aberration can be effectively corrected by suitably setting the positions of the thick meniscus lens with a small Abbe number and an aperture stop. However, the angle of view is 76°, which is relatively small, and an image with a large field of view cannot be formed.

Patent Document 1: Japanese Unexamined Patent Application Publication No. 02-077712
Patent Document 2: Japanese Unexamined Patent Application Publication No. 14-072085
Patent Document 3: PCT Japanese Translation Patent Publication No. 09-503600

DISCLOSURE OF INVENTION

Problems to be Solved by the Invention

The present invention solves the above-described problems of the known structures, and an object of the present invention is to provide an optical apparatus which has a large degree of design freedom, which is capable of setting a central projection method expressed as f·tan θ, a stereographic projection method expressed as 2f·tan(θ/2), or a conformal projection method expressed as f·θ, which provides a field of view with a large angle of view, such as more than 180°, and which can be constituted by a small number of lenses.

In addition, another object of the present invention is to provide an optical apparatus capable of setting a projection method, such as the conformal projection method or the stereographic projection method, with a smaller reduction ratio at a peripheral region than those in other optical apparatuses with the same number of lenses, or a method that has a relatively small reduction ratio at a peripheral region and that is capable of ensuring the resolution of picture elements such as CCD, whose pixel size is determined, in the peripheral region.

Means for Solving the Problems

According to the present invention, an optical apparatus includes at least one negative lens, a meniscus lens that is convex on an object side, an aperture stop, and a double-convex positive lens arranged from the object side to an image side, wherein at least one of the lenses positioned on the object side of the aperture stop and the positive lens include respective aspherical surfaces, and wherein, when va is an average Abbe number of all of the lenses excluding the meniscus lens, vb is an Abbe number of the meniscus lens, f is a focal length of the entire system, f12 is a combined focal length of the negative lens unit and the meniscus lens, ts is a distance between the aperture stop and the positive lens along an axis, L is a distance between a vertex of a lens surface nearest to the object side and a vertex of a lens surface nearest to the image side, t2 is a central thickness of the meniscus lens, θs is an incident angle of a chief ray that passes through the aperture stop at a maximum angle of view, the above-provided Expression 1 is satisfied.

In addition, according to the present invention, an optical apparatus includes at least one negative lens, a positive meniscus lens that is convex on an object side, an aperture stop, and a double-convex positive lens arranged from the object side to an image side, wherein at least one of the lenses positioned on the object side of the aperture stop and the positive lens include respective aspherical surfaces, wherein an amount of correction of sagittal field curvature by the lenses positioned on the object side of the aperture stop is larger than an amount of correction of sagittal field curvature by the positive lens, and wherein, when va is an average Abbe number of all of the lenses excluding the meniscus lens, vb is an Abbe number of the meniscus lens, L is a distance between a vertex of a lens surface nearest to the object side and a vertex of a lens surface nearest to the image side, ts is a distance between the aperture stop and the double-convex lens, and t2 is a central thickness of the meniscus lens, the above-provided Expression 2 is satisfied.

In addition, according to the present invention, the optical apparatus includes a single negative lens, the meniscus lens that is convex on the object side, the aperture stop, and the double-convex positive lens arranged from the object side to the image side, and the optical apparatus is capable of performing central projection of an object space within an angle of field of 80 degrees or more toward the object side onto an image pickup device.

In addition, according to the present invention, the optical apparatus includes two negative lenses, the meniscus lens that is convex on the object side, the aperture stop, and the double-convex positive lens arranged from the object side to the image side, and the optical apparatus is capable of performing stereographic projection of an object space within an angle of field of 120 degrees or more toward the object side onto an image pickup device.

In addition, according to the present invention, the optical apparatus includes three negative lenses, the meniscus lens that is convex on the object side, the aperture stop, and the double-convex positive lens arranged from the object side to the image side, and the optical apparatus is capable of performing stereographic projection of an object space within an angle of field of 180 degrees or more toward the object side onto an image pickup device.

In the above-described invention, the positive lens preferably has aspherical surfaces on either side thereof, and the negative lens nearest to the object side may be a glass spherical lens. In addition, the positive lens may be a glass aspherical lens.

In the above-described invention, all of the lenses are composed of resin, and the meniscus lens may consist of two separate lenses.

According to the above-described structure, an optical apparatus that covers a wide-angle region and that can be used for capturing images for various purposes can be obtained.

ADVANTAGES

The present invention provides a high-brightness, small, low-cost optical apparatus which covers a wide-angle to super-wide-angle region, which reliably corrects various aberrations with a small number of lenses, and which has a small image reduction ratio at a peripheral region.

BEST MODE FOR CARRYING OUT THE INVENTION

FIG. 1 is a sectional view illustrating an optical apparatus according to an embodiment of the present invention. In FIG. 1, an optical axis of the optical apparatus is denoted by O1-O2, where O1 corresponds to the object side and O2 corresponds to the image side. A light flux that enters from the object side passes through a negative lens unit 1 including three concave lenses 1a, 1b, and 1c, a positive meniscus lens 2, an aperture stop S, and a double-convex positive lens 3 in that order, and forms an image on a light receiving plane of an image pickup device 5. A cover glass 4, a low-pass filter, etc., are placed between the positive lens 3 and the image pickup device 5 as necessary.

The negative lens unit 1 (1a, 1b, 1c) disposed at the object side has a function of converting the light flux that enters from the object side at a large angle of view into a light flux with a small incident angle. The number of lenses is set in accordance with the incident angle at the object side and the required projection method. Accordingly, an incident angle θs of the chief ray corresponding to a maximum angle of view on the double-convex positive lens 3 is set within a predetermined range. The angle θs is an angle between the chief ray that is incident on the object-side surface of the positive lens 3 through the aperture stop S at the maximum angle of view and the optical axis O1-O2.

The meniscus lens 2 disposed on the image side of the negative lens unit 1 has a small Abbe number, and performs achromatization of light incident in different directions on the axis and correction of lateral chromatic aberration (chromatic aberration in the image height direction (y direction)).

The aperture stop S and the double-convex positive lens 3 disposed at the image side mainly provide an image-forming function. A combined focal length f12 of the negative lens unit 1 and the meniscus lens 2 provides negative power, and an intermediate image (virtual image) is formed at a position on the object side of the aperture stop S. The present invention aims to provide a wide-angle lens (optical apparatus) having the above-described basic structure.

Next, the characteristics of the above-described optical apparatus will be explained. According to the embodiment of the present invention, the image-forming function is mainly provided only by the double-convex positive lens 3 having the aperture stop S on the object side thereof. Therefore, the structure on the image side of the aperture stop S can be constituted by a minimum number of lenses.

Here, aberrations of the double-convex positive lens 3 having the aperture stop S on the object side thereof are generally characterized by: insufficient correction of sagittal field curvature (tilting of sagittal image plane toward the object side), generation of coma aberration in a region where the angle of view is large, and positive distortion. The behavior of the sagittal field curvature can be understood from the transmission characteristics of light rays. For example, a case is considered in which the aperture stop S coincides with the object-side surface of the positive lens 3 for simplicity. In this case, with respect to the light flux that travels along the optical axis O1-O2, the curvature of the object-side surface of the positive lens 3 in the sagittal cross section and that in the meridional cross section are equal to each other. Therefore, there is no difference in the field curvature. However, at a position separated from the optical axis O1-O2 on the image side surface of the positive lens 3, the sagittal curvature is smaller than the meridional curvature. Therefore, with respect to the light velocity incident on the object side surface of the positive lens 3 at a position separated from the optical axis O1-O2, the sagittal image plane is tilted toward the object side from the paraxial image point. This is called the sagittal field curvature.

In the lens units 1 and 2 on the object side of the aperture stop S, aberrations are generated for a reason opposite to the above-described reason. In the optical apparatus according to the present embodiment, the sagittal field curvature caused by the lens units 1 and 2 is excessively corrected so as to cancel the sagittal field curvature caused by the positive lens 3. Thus, the aberration is corrected. This method is also used for correcting the coma aberration. To smoothly cancel the aberrations as described above, it is important that at least one of the lens units 1 and 2 on the object side of the aperture stop S and the positive lens 3 have respective aspherical surfaces. If the degree of freedom is not sufficient, an additional aspherical surface can be provided. In particular, the positive lens 3, which has a relatively small degree of freedom, preferably has an aspherical surface on each side thereof.

In addition, the positive distortion of the positive lens 3 having the aperture stop S on the object side thereof can be corrected by combination with the negative lens unit 1.

To form the positive lens 3 positioned at the image side of the aperture stop S with a single lens and to effectively cancel the above-described aberrations, it is necessary that the incident angle θs of the chief ray that is incident on the object-side surface of the positive lens 3 through the aperture stop S at the maximum angle of view be in the range of the following Expression 3:

$$25° < \theta s < 40°$$ [Expression 3]

If the incident angle θs is equal to or below the lower limit of Expression 3, a focal length of the positive lens 3 for ensuring the required image height becomes relatively long, and the aberrations cannot be efficiently canceled. In addition, it becomes difficult to reduce the size of the optical apparatus. If the incident angle θs is equal to or above the upper limit of Expression 3, the aberrations including the sagittal field curvature and the coma aberration are greatly increased, and a complex lens structure is required on the object side of the aperture stop S to cancel the aberrations. Therefore, the number of lenses cannot be easily reduced.

The negative lens unit 1 serves to cancel the aberrations of the positive lens 3 as described above and adjusts the angle of the light flux incident on the positive lens 3. In addition, the negative lens unit 1 also contributes to providing the required projection characteristics.

In the optical apparatus constituting the wide-angle lens, there is a problem of how to correct the lateral chromatic aberration. In the optical apparatus according to the present embodiment, the convex meniscus lens 2 having a relatively small Abbe number compared to those of other lenses is disposed at the object side, and the aperture stop S is disposed on the image side of the meniscus lens 2. Accordingly, the longitudinal chromatic aberration and the lateral chromatic aberration are corrected at the same time. The condition of the following Expression 4 serves as the essential condition for correcting the chromatic aberrations.

$$1.4 < va/vb$$ [Expression 4]

The following Expression 5 is the condition for effectively correcting the lateral chromatic aberration. More specifically, the meniscus lens 2 is formed as a lens having a relatively large thickness in the optical axis direction so as to ensure the degree of freedom in correction of the lateral chromatic aberration by utilizing a height difference corresponding to the angle of view of light incident on the object side surface of the meniscus lens 2.

$$0.2 < t2/L < 0.5$$ [Expression 5]

If the value of Expression 5 is equal to or below the lower limit thereof, it becomes difficult to correct the lateral chromatic aberration. If the value of Expression 5 is equal to or above the upper limit thereof, the length and diameter of the entire system will be increased. In addition, it becomes difficult to manufacture the meniscus lens 2 if the thickness thereof is excessively increased. Although the costs will be increased, the meniscus lens 2 may also be formed of two separate lenses as a common modification thereof. Also in such a case, the following discussion can be applied by considering the two separate lenses as a combined system. In addition, also in this case, the incident surface of the first lens is convex and the exit surface of the second lens is concave.

In addition, the meniscus lens 2 is preferably formed as a lens with positive power (combined focal length) or a negative lens with weak power. Accordingly, the color correction can be effectively performed when, in particular, the angle of view is large. In the optical apparatus described in Patent Document 3, the meniscus lens has a relatively strong negative power. Therefore, the lateral chromatic aberration is increased as the angle of view is increased and the object of the present invention cannot be easily achieved.

In addition, if the combined power (combined focal length) f12 of the negative lens unit 1 and the meniscus lens 2 is positive, it becomes difficult to cancel the aberrations of the positive lens 3 and the aberrations of the negative lens unit 1 disposed in front of the aperture stop S as described above. Therefore, it becomes necessary to introduce a redundant degree of freedom. Accordingly, in the optical apparatus according to the embodiment of the present invention, the combined focal length f12 of the negative lens unit 1 and the meniscus lens 2 is preferably in the range of the following Expression 6:

$$-10 < f12/f < -1.0$$ [Expression 6]

In addition, a focal length f3 of the positive lens 3 and the combined focal length f12 preferably satisfy the following Expression 7:

$$-5 < f12/f3 < -0.2$$ [Expression 7]

Next, with regard to the arrangement position of the aperture stop S, it is necessary to place the aperture stop S on the image side of the meniscus lens 2 for providing a difference in the light-ray height. A distance t2S between the meniscus lens 2 and the aperture stop S along the optical axis O1-O2 preferably satisfies the following Expression 8:

$$0 \leq t2S/L < 0.2$$ [Expression 8]

If the value of Expression 8 is equal to or above the upper limit thereof, the overall length of the system will be increased. An on-axis distance ts between the aperture stop S and the positive lens 3 preferably satisfies the following Expression 9:

$$0 \leq ts/L < 0.1$$ [Expression 9]

If the value of Expression 9 is equal to or above the upper limit thereof, the height of light rays that pass through the positive lens 3 becomes relatively large, which is disadvantageous for the balance of aberrations. If the meniscus lens 2 is constituted of two separate lenses, the aperture stop S can be placed between the two separate lenses. In such a case, the following Expression 10 must be satisfied in place of Expression 8. In this case, the condition of Expression 9 can be automatically satisfied.

$$-0.1 < t2S/L < 0.2$$ [Expression 10]

Next, the material of each lens will be explained.

In the case in which aspherical surfaces are positively used to balance the aberrations, lenses having the aspherical surfaces are preferably formed of synthetic resin in view of cost. It is not essential that the meniscus lens 2 be formed of glass having an extremely small Abbe number. Instead, the meniscus lens 2 may also be formed of synthetic resin, such as polycarbonate or polystyrene, having a relatively large Abbe number compared to that of glass. Therefore, all of the lenses can be formed of resin without difficulty. However, if it is difficult to use a resin lens at a position nearest to the object side, such as in on-vehicle applications, a glass spherical lens can be placed nearest to the object side in the negative lens unit 1.

If the optical apparatus is expected to be used in environments with large variations, it is important to reduce variation in performance in accordance with, for example, temperature variation. According to the embodiment of the present invention, even when all of the lenses are formed of synthetic resin, such a compensation can be achieved by optimizing the power distribution over the lenses within the limitation of the required conditions. If a glass lens is positioned nearest to the object side and the other lenses are formed of synthetic resin as described above, or if a glass lens having a small Abbe number is used as the meniscus lens and the other lenses are formed of synthetic resin, the balance between lens characteristics is disturbed by the temperature variation and it may become difficult to achieve temperature compensation. In such a case, a glass aspherical lens with a small temperature coefficient is used as the positive lens 3, so that temperature compensation can be achieved. All of the lenses may, of course, also be formed of glass. According to the embodiment of the present invention, resin lenses can be used in the lens system without difficulty, which is important in providing a low-cost optical apparatus.

An upper limit of the ratio of Abbe numbers (va/vb) shown in the above Expression 4 will now be described. If the meniscus lens 2 is formed of glass having a small Abbe number (va is about 19.3) and the other lenses are formed of an optical material with a highest Abbe number (vb is about 70), the upper limit is about 3.6. If the meniscus lens 2 is formed of polycarbonate or polystyrene resin, vb is about 30. In addition, if the other lenses are formed of another optical resin material (e.g., PMMA), va has an upper limit of about 60. Therefore, if all of the lenses are formed of synthetic resin material, the upper limit of the above-mentioned ratio is about 2.0. In addition, if the meniscus lens 2 is formed of glass having a small Abbe number and the other lenses are formed of the optical resin material, the upper limit of the above-mentioned ratio is about 3.1.

Next, projection methods of the optical apparatus will be explained below.

In common camera lenses, the central projection method expressed as y=f tan θ is used. Here, y is the image height on the image pickup device, and the angle of view is 2θ. However, when the angle of view is increased, it is not practical to use the central projection method because the number of lenses must be increased. In addition, when the angle of view is close to or above 180°, it is not practical to use the central projection method, and other methods, such as an orthogonal projection method (f·sin θ), a conformal projection method (f·θ), and a stereographic projection method (2f·tan(θ/2)), which are projection methods of fish-eye lenses, are used instead. These projection methods determine the image reduction ratio at a peripheral region around the screen center, and the system structure becomes more complex in the order of the orthogonal projection method, the conformal projection method, and the stereographic projection method. The orthogonal projection method can be achieved by a relatively simple, small structure. However, when the pixel size is determined as in a CCD, the image reduction ratio at the peripheral region is higher than those of other methods, and there may be a case in which the original image cannot be restored by magnifying the image by image processing or the like.

The optical apparatus according to the embodiment of the present invention has a relatively simple structure and is capable of achieving a method with a small image reduction ratio at the peripheral region. This is realized by the above-described functions of cancelling the main aberrations between the components at the object side and the components at the image side and correcting the lateral chromatic aberration.

EXAMPLES

Next, examples of the present invention will be explained. In the examples, an optical surface of at least one lens is aspherical. The aspherical surface is defined by the following Expression 11. However, the present invention is not limited to this type.

$$z = \frac{ch^2}{1 + \sqrt{1 - (1+k)c^2h^2}} + A_4h^4 + A_6h^6 + A_8h^8 + \ldots + A_{26}h^{26} \quad \text{[Expression 11]}$$

In Expression 11, z shows the surface from the reference plane that passes through the vertex of the aspherical surface in the optical axes direction. In addition, c shows the reciprocal of the radius of curvature R of the surface, and h shows the height of the surface from the optical axis. In addition, k is the conical constant showing a second-order curve, and A4 to A26 are correction coefficients of the aspherical surface.

FIGS. 2, 4, 6, 8, 10, 12, and 13 show optical apparatuses according to the examples of the present invention. In the examples shown in the above-mentioned figures and examples not shown in the figures, reference symbols have the following meanings:

R: curvature of the optical surface of each lens (mm);

D: thickness of each lens along the optical axis (mm) or distance between lenses or between a lens and the cover glass 4 along the optical axis (mm);

N: relative refractive index of each lens and the cover glass 4;

V: Abbe number of each lens and the cover glass 4;

va: average Abbe number of the lenses excluding the meniscus lens and the cover glass 4;

vb: Abbe number of the meniscus lens;

f: focal length of the optical apparatus (mm);

f1: focal length of the negative lens unit (mm);

f2: focal length of the meniscus lens (mm);

f3: focal length of the double-convex positive lens (mm);

f12: combined focal length of the negative lens unit and the meniscus lens (mm);

f23: combined focal length of the meniscus lens and the double-convex positive lens (mm);

t2: thickness of the meniscus lens along the optical axis (mm);

t2S: distance between the image-side surface of the meniscus lens and the aperture stop along the optical axis (mm);

tS: distance between the aperture stop and the double-convex positive lens along optical axis (mm);

L: distance between the vertex of the lens surface nearest to the object side and the vertex of the lens surface nearest to the image side (mm); and θs: angle of chief ray that passes through the aperture stop at the maximum angle of view (°).

In each example, the aperture stop S is disposed between the meniscus lens 2 and the positive lens 3. The distance between the meniscus lens 2 and the aperture stop S along the optical axis and the distance between the aperture stop S and the positive lens along the optical axis are denoted by D (for example, D6 and D7 shown in FIG. 6). However, in Example 1 shown in FIG. 2, the aperture stop S is in contact with surface R7 of the positive lens 3. Similarly, the aperture stop S is in contact with surface R5 of the positive lens 3 in Example 2 shown in FIG. 4, and the aperture stop S is in contact with the contact with surface R9 of the positive lens 3 in Example 12 shown in FIG. 10.

Table 1 show parameters R, D, N, and V of the optical apparatuses according to Examples 1 to 5 of the present invention.

FIG. 2 shows an optical apparatus according to Example 1, FIG. 3(A) shows a graph of astigmatism according to Example 1, and FIG. 3(B) shows a graph of distortion according to Example 1. FIG. 4 shows an optical apparatus according to Example 2, FIG. 5(A) shows a graph of astigmatism according to Example 2, and FIG. 5(B) shows a graph of distortion according to Example 2. FIG. 6 shows an optical apparatus according to Example 4, FIG. 7(A) shows a graph of astigmatism according to Example 4, and FIG. 7(B) shows a graph of distortion according to Example 4. FIG. 8 shows an optical apparatus according to Example 5, FIG. 9(A) shows a graph of astigmatism according to Example 5, and FIG. 9(B) shows a graph of distortion according to Example 5.

TABLE 1

| Radius of Curvature | | Distance | | Refractive Index | | Abbe Number | |
|---|---|---|---|---|---|---|---|
| Example 1 | | | | | | | |
| R1 | 22.883 | D1 | 0.700 | N1 | 1.5425 | V1 | 62.9 |
| R2 | 5.449 | D2 | 0.985 | N2 | | V2 | |
| R3 | −9.936 | D3 | 0.700 | N3 | 1.5251 | V3 | 56.3 |
| R4 | 1.302 | D4 | 0.440 | N4 | | V4 | |
| R5 | 2.387 | D5 | 4.500 | N5 | 1.6073 | V5 | 26.6 |
| R6 | 2.234 | D6 | 0.100 | N6 | | V6 | |
| R7 | 1.096 | D7 | 2.440 | N7 | 1.5425 | V7 | 62.9 |
| R8 | −1.318 | D8 | 1.287 | N8 | | V8 | |
| R9 | 0.000 | D9 | 0.300 | N9 | 1.5163 | V9 | 64.1 |
| R10 | 0.000 | D10 | 0.275 | | | | |
| Example 2 | | | | | | | |
| R1 | 3.332 | D1 | 0.700 | N1 | 1.5251 | V1 | 56.3 |
| R2 | 0.776 | D2 | 0.935 | N2 | | V2 | |
| R3 | 1.211 | D3 | 1.424 | N3 | 1.6073 | V3 | 26.6 |
| R4 | 0.997 | D4 | 0.294 | N4 | | V4 | |
| R5 | 0.958 | D5 | 2.380 | N5 | 1.5251 | V5 | 56.3 |
| R6 | −0.696 | D6 | 0.500 | N6 | | V6 | |
| R7 | 0.000 | D7 | 0.300 | N7 | 1.5163 | V7 | 64.1 |
| R8 | 0.000 | D8 | 0.275 | | | | |
| Example 3 | | | | | | | |
| R1 | −2.992 | D1 | 0.700 | N1 | 1.5251 | V1 | 56.3 |
| R2 | 1.645 | D2 | 0.100 | N2 | | V2 | |
| R3 | 2.147 | D3 | 2.616 | N3 | 1.6073 | V3 | 26.6 |
| R4 | 3.053 | D4 | 0.050 | N4 | | V4 | |
| R5 | 0.000 | D5 | 0.050 | N5 | | V5 | |
| R6 | 1.028 | D6 | 2.553 | N6 | 1.5251 | V6 | 56.3 |
| R7 | −1.038 | D7 | 0.790 | N7 | | V7 | |
| R8 | 0.000 | D8 | 0.300 | N8 | 1.5163 | V8 | 64.1 |
| R9 | 0.000 | D9 | 0.275 | | | | |
| Example 4 | | | | | | | |
| R1 | 15.703 | D1 | 0.700 | N1 | 1.5251 | V1 | 56.3 |
| R2 | 6.750 | D2 | 2.551 | N2 | | V2 | |
| R3 | −8.098 | D3 | 0.700 | N3 | 1.5251 | V3 | 56.3 |
| R4 | 3.023 | D4 | 1.729 | N4 | | V4 | |
| R5 | 2.183 | D5 | 3.706 | N5 | 1.6073 | V5 | 26.6 |
| R6 | 0.730 | D6 | 0.461 | N6 | | V6 | |
| R7 | 0.000 | D7 | 0.050 | N7 | | V7 | |
| R8 | 1.022 | D8 | 1.596 | N8 | 1.5251 | V8 | 56.3 |
| R9 | −0.904 | D9 | 1.271 | N9 | | V9 | |
| R10 | 0.000 | D10 | 0.300 | N10 | 1.5163 | V10 | 64.1 |
| R11 | 0.000 | D11 | 0.275 | | | | |

TABLE 1-continued

| Radius of Curvature | | Distance | | Refractive Index | | Abbe Number | |
|---|---|---|---|---|---|---|---|
| Example 5 | | | | | | | |
| R1 | 5.223 | D1 | 0.700 | N1 | 1.5251 | V1 | 56.3 |
| R2 | 3.628 | D2 | 2.059 | N2 | | V2 | |
| R3 | −8.126 | D3 | 0.700 | N3 | 1.5251 | V3 | 56.3 |
| R4 | 1.192 | D4 | 0.492 | N4 | | V4 | |
| R5 | 2.193 | D5 | 4.300 | N5 | 1.6073 | V5 | 26.6 |
| R6 | 1.934 | D6 | 0.050 | N6 | | V6 | |
| R7 | 0.000 | D7 | 0.050 | N7 | | V7 | |
| R8 | 1.160 | D8 | 2.159 | N8 | 1.5251 | V8 | 56.3 |
| R9 | −0.881 | D9 | 1.051 | N9 | | V9 | |
| R10 | 0.000 | D10 | 0.300 | N10 | 1.5163 | V10 | 64.1 |
| R11 | 0.000 | D11 | 0.275 | | | | |

Table 2 shows aspherical surface coefficients of the optical surface of each lens in Examples 1 to 5.

TABLE 2

| Surface | Conical Constant | A4 | A6 | A8 | A10 |
|---|---|---|---|---|---|
| Example 1 | | | | | |
| R1 | | | | | |
| R2 | | | | | |
| R3 | | | | | |
| R4 | −0.9375 | −3.640E−03 | −8.344E−04 | −1.300E−03 | 8.247E−05 |
| R5 | −0.0297 | 1.222E−02 | −1.196E−03 | −7.928E−04 | −4.011E−05 |
| R6 | | | | | |
| R7 | −2.3978 | 7.676E−02 | 6.389E−02 | −4.182E−01 | 6.756E−01 |
| R8 | −1.3704 | 5.763E−02 | 1.552E−02 | 1.726E−02 | 2.943E−02 |
| R9 | | | | | |
| R10 | | | | | |
| Example 2 | | | | | |
| R1 | | −4.866E−02 | −9.774E−04 | 2.019E−03 | −2.597E−04 |
| R2 | −0.7559 | −2.157E−01 | −2.207E−01 | −1.727E−02 | 1.278E−02 |
| R3 | −0.3171 | −1.832E−01 | −2.007E−01 | 2.168E−01 | −1.207E−01 |
| R4 | | | | | |
| R5 | 3.1501 | −6.647E−01 | −2.307E+00 | 2.845E+00 | |
| R6 | −1.0876 | −1.527E−01 | 6.311E−02 | −1.689E−01 | 2.256E−01 |
| R7 | | | | | |
| R8 | | | | | |
| Example 3 | | | | | |
| R1 | 0.0000 | −1.126E−02 | 3.624E−03 | 2.353E−03 | −5.696E−04 |
| R2 | −3.8780 | −8.422E−03 | −3.357E−02 | 7.859E−02 | −3.712E−02 |
| R3 | 0.4022 | −1.478E−02 | 4.768E−03 | 4.414E−02 | −3.131E−02 |
| R4 | | | | | |
| R5 | | | | | |
| R6 | 0.0282 | −1.759E−01 | 1.753E−01 | −2.536E+00 | 7.378E+00 |
| R7 | −1.4571 | −9.776E−02 | −5.552E−04 | 2.960E−02 | 3.433E−02 |
| R8 | | | | | |
| R9 | | | | | |
| Example 4 | | | | | |
| R1 | | | | | |
| R2 | 1.6574 | −4.856E−03 | −1.871E−04 | −3.793E−06 | 8.473E−07 |
| R3 | | | | | |
| R4 | −4.4971 | −1.419E−03 | −1.312E−04 | | |
| R5 | −0.4630 | −5.518E−04 | 2.954E−04 | | |
| R6 | | | | | |
| R7 | | | | | |
| R8 | −0.8528 | −2.521E−02 | −1.002E−01 | −1.833E−06 | |
| R9 | −5.5195 | −5.363E−01 | 1.071E+00 | −1.029E+00 | 1.009E+00 |
| R10 | | | | | |
| R11 | | | | | |
| Example 5 | | | | | |
| R1 | 0.0000 | −6.751E−03 | 1.740E−04 | 1.015E−06 | −1.384E−07 |
| R2 | | | | | |
| R3 | | | | | |
| R4 | −1.2773 | −2.747E−02 | −3.203E−03 | −3.541E−04 | |

TABLE 2-continued

| Surface | Conical Constant | A4 | A6 | A8 | A10 |
|---|---|---|---|---|---|
| R5 | −0.0154 | −4.271E−02 | −9.401E−03 | 1.591E−04 | |
| R6 | | | | | |
| R7 | | | | | |
| R8 | −2.0462 | | | | |
| R9 | −3.3507 | −2.524E−01 | 2.158E−01 | −2.322E−02 | |
| R10 | | | | | |
| R11 | | | | | |

Table 3 show parameters R, D, N, and V of the optical apparatuses according to Examples 6 to 9 of the present invention.

TABLE 3

| Radius of Curvature | | Distance | | Refractive Index | | Abbe Number | |
|---|---|---|---|---|---|---|---|
| *Example 6* | | | | | | | |
| R1 | 13.873 | D1 | 0.800 | N1 | 1.5251 | V1 | 56.3 |
| R2 | 26.999 | D2 | 2.216 | N2 | | V2 | |
| R3 | 49.391 | D3 | 0.600 | N3 | 1.5251 | V3 | 56.3 |
| R4 | 1.572 | D4 | 0.948 | N4 | | V4 | |
| R5 | −4.553 | D5 | 0.700 | N5 | 1.5251 | V5 | 56.3 |
| R6 | 1.648 | D6 | 0.100 | N6 | | V6 | |
| R7 | 2.629 | D7 | 3.000 | N7 | 1.9068 | V7 | 21.2 |
| R8 | 3.738 | D8 | 0.100 | N8 | | V8 | |
| R9 | 0.966 | D9 | 2.000 | N9 | 1.5891 | V9 | 61.2 |
| R10 | −0.809 | D10 | 0.500 | N10 | | V10 | |
| R11 | 0.000 | D11 | 0.300 | N11 | 1.5163 | V11 | 64.1 |
| R12 | 0.000 | D12 | 0.275 | | | | |
| *Example 7* | | | | | | | |
| R1 | 10.469 | D1 | 0.600 | N1 | 1.5251 | V1 | 56.3 |
| R2 | 4.605 | D2 | 1.934 | N2 | | V2 | |
| R3 | −12.300 | D3 | 0.573 | N3 | 1.5251 | V3 | 56.3 |
| R4 | 4.642 | D4 | 0.533 | N4 | | V4 | |
| R5 | −5.585 | D5 | 0.700 | N5 | 1.5251 | V5 | 56.3 |
| R6 | 1.539 | D6 | 0.182 | N6 | | V6 | |
| R7 | 1.547 | D7 | 2.673 | N7 | 1.6073 | V7 | 26.6 |
| R8 | 2.794 | D8 | 0.050 | N8 | | V8 | |
| R9 | 0.000 | D9 | 0.050 | N9 | | V9 | |
| R10 | 0.952 | D10 | 2.293 | N10 | 1.5251 | V10 | 56.3 |
| R11 | −0.693 | D11 | 0.400 | N11 | | V11 | |
| R12 | 0.000 | D12 | 0.300 | N12 | 1.5163 | V12 | 64.1 |
| R13 | 0.000 | D13 | 0.275 | | | | |
| *Example 8* | | | | | | | |
| R1 | 11.273 | D1 | 0.600 | N1 | 1.5251 | V1 | 56.3 |
| R2 | 4.427 | D2 | 2.047 | N2 | | V2 | |
| R3 | −12.964 | D3 | 0.617 | N3 | 1.5251 | V3 | 56.3 |
| R4 | 3.758 | D4 | 0.425 | N4 | | V4 | |
| R5 | −6.870 | D5 | 0.700 | N5 | 1.5251 | V5 | 56.3 |
| R6 | 1.481 | D6 | 0.394 | N6 | | V6 | |
| R7 | 1.568 | D7 | 2.000 | N7 | 1.6073 | V7 | 26.6 |
| R8 | 2.791 | D8 | 0.259 | N8 | | V8 | |
| R9 | 0.000 | D9 | 0.050 | N9 | | V9 | |
| R10 | 0.954 | D10 | 1.976 | N10 | 1.5251 | V10 | 56.3 |
| R11 | −0.892 | D11 | 0.498 | N11 | | V11 | |
| R12 | 0.000 | D12 | 0.300 | N12 | 1.5163 | V12 | 64.1 |
| R13 | 0.000 | D13 | 0.275 | | | | |
| *Example 9* | | | | | | | |
| R1 | 17.435 | D1 | 0.800 | N1 | 1.5251 | V1 | 56.3 |
| R2 | 5.798 | D2 | 2.749 | N2 | | V2 | |
| R3 | 48.856 | D3 | 0.600 | N3 | 1.5251 | V3 | 56.3 |
| R4 | 1.482 | D4 | 1.496 | N4 | | V4 | |
| R5 | −11.157 | D5 | 0.700 | N5 | 1.5251 | V5 | 56.3 |
| R6 | 1.579 | D6 | 0.234 | N6 | | V6 | |
| R7 | 2.503 | D7 | 4.300 | N7 | 1.9068 | V7 | 21.2 |
| R8 | 3.628 | D8 | 0.050 | N8 | | V8 | |
| R9 | 0.000 | D9 | 0.050 | N9 | | V9 | |
| R10 | 0.952 | D10 | 1.626 | N10 | 1.5891 | V10 | 61.2 |
| R11 | −1.219 | D11 | 0.698 | N11 | | V11 | |

TABLE 3-continued

| Radius of Curvature | | Distance | | Refractive Index | | Abbe Number | |
|---|---|---|---|---|---|---|---|
| R12 | 0.000 | D12 | 0.300 | N12 | 1.5163 | V12 | 64.1 |
| R13 | 0.000 | D13 | 0.275 | | | | |

Table 4 shows aspherical surface coefficients of the optical surface of each lens in Examples 6 to 9.

TABLE 4

| Surface | Conical Constant | A4 | A6 | A8 | A10 |
|---|---|---|---|---|---|
| *Example 6* | | | | | |
| R1 | | | | | |
| R2 | 12.9992 | 6.383E−03 | −4.780E−05 | −1.819E−06 | 1.851E−07 |
| R3 | | | | | |
| R4 | −2.5949 | −1.854E−02 | 8.039E−03 | 2.587E−03 | −4.816E−06 |
| R5 | | | | | |
| R6 | −2.1167 | −3.109E−02 | 6.505E−03 | 2.853E−03 | 2.888E−04 |
| R7 | | | | | |
| R8 | | | | | |
| R9 | −0.9364 | −1.389E−01 | 6.319E−01 | −2.018E+00 | |
| R10 | −1.8055 | 2.314E−01 | −3.721E−01 | 6.687E−01 | |
| R11 | | | | | |
| R12 | | | | | |
| *Example 7* | | | | | |
| R1 | | | | | |
| R2 | 0.2373 | 9.468E−03 | −4.193E−05 | −2.262E−06 | |
| R3 | | | | | |
| R4 | 2.1156 | 2.767E−02 | 4.818E−03 | −1.720E−04 | |
| R5 | | | | | |
| R6 | −0.5661 | −4.924E−03 | −1.366E−02 | −1.204E−02 | |
| R7 | 0.2531 | 4.050E−02 | −8.343E−03 | −2.707E−02 | |
| R8 | | | | | |
| R9 | | | | | |
| R10 | −1.1197 | −7.753E−02 | 1.231E−02 | 3.965E−01 | |
| R11 | −2.0218 | −2.403E−02 | 5.870E−02 | 2.138E−01 | |
| R12 | | | | | |
| R13 | | | | | |
| *Example 8* | | | | | |
| R1 | | | | | |
| R2 | 0.0267 | 8.705E−03 | −4.528E−05 | −2.289E−06 | |
| R3 | | | | | |
| R4 | −0.3662 | 9.131E−03 | −6.100E−04 | 8.233E−04 | |
| R5 | | | | | |
| R6 | −0.4033 | −1.157E−03 | −4.853E−03 | −7.421E−03 | |
| R7 | 0.5682 | 2.767E−02 | −1.325E−02 | −1.920E−02 | |
| R8 | | | | | |
| R9 | | | | | |
| R10 | −0.4523 | 3.225E−02 | −3.031E+00 | 1.724E+01 | |
| R11 | −1.7323 | 9.519E−02 | 2.786E−01 | 5.991E−02 | |
| R12 | | | | | |
| R13 | | | | | |
| *Example 9* | | | | | |
| R1 | | | | | |
| R2 | −8.0725 | 6.017E−03 | −6.593E−06 | −2.872E−06 | 1.703E−08 |
| R3 | | | | | |
| R4 | −1.9106 | 1.443E−02 | 2.026E−03 | 1.312E−04 | −3.617E−05 |
| R5 | | | | | |
| R6 | −0.6051 | −9.441E−03 | −4.057E−03 | 1.013E−03 | −9.762E−05 |
| R7 | | | | | |
| R8 | | | | | |
| R9 | | | | | |
| R10 | −0.9132 | −1.158E−01 | 5.043E−01 | −8.537E−01 | |
| R11 | −1.7112 | 1.911E−01 | −1.687E−01 | 8.176E−01 | |
| R12 | | | | | |
| R13 | | | | | |

Table 5 show parameters R, D, N, and V of the optical apparatuses according to Examples 10 to 13 of the present invention. In Example 13, the meniscus lens 2 is constituted of two separate lenses.

FIG. 10 shows an optical apparatus according to Example 12, FIG. 11(A) shows a graph of astigmatism according to Example 12, and FIG. 11(B) shows a graph of distortion according to Example 12.

TABLE 5

| Radius of Curvature | | Distance | | Refractive Index | | Abbe Number |
|---|---|---|---|---|---|---|
| Example 10 | | | | | | |
| R1 | 16.734 | D1 | 0.800 | N1 | 1.5251 | V1 | 56.3 |
| R2 | 7.308 | D2 | 2.638 | N2 | | V2 | |
| R3 | 81.463 | D3 | 0.600 | N3 | 1.5251 | V3 | 56.3 |
| R4 | 1.434 | D4 | 1.537 | N4 | | V4 | |
| R5 | −17.839 | D5 | 0.700 | N5 | 1.5251 | V5 | 56.3 |
| R6 | 1.414 | D6 | 0.409 | N6 | | V6 | |
| R7 | 2.162 | D7 | 4.050 | N7 | 1.8467 | V7 | 23.9 |
| R8 | 4.902 | D8 | 0.100 | N8 | | V8 | |
| R9 | 0.973 | D9 | 1.570 | N9 | 1.5251 | V9 | 56.3 |
| R10 | −0.985 | D10 | 0.558 | N10 | | V10 | |
| R11 | 0.000 | D11 | 0.300 | N11 | 1.5163 | V11 | 64.1 |
| R12 | 0.000 | D12 | 0.275 | | | | |
| Example 11 | | | | | | |
| R1 | 12.977 | D1 | 0.700 | N1 | 1.5251 | V1 | 56.3 |
| R2 | 3.497 | D2 | 2.706 | N2 | | V2 | |
| R3 | −381.030 | D3 | 0.500 | N3 | 1.5251 | V3 | 56.3 |
| R4 | 2.676 | D4 | 1.000 | N4 | | V4 | |
| R5 | 239.374 | D5 | 0.600 | N5 | 1.5251 | V5 | 56.3 |
| R6 | 1.466 | D6 | 0.425 | N6 | | V6 | |
| R7 | 2.431 | D7 | 4.428 | N7 | 1.6073 | V7 | 26.6 |
| R8 | 7.565 | D8 | 0.050 | N8 | | V8 | |
| R9 | 0.000 | D9 | 0.050 | N9 | | V9 | |
| R10 | 0.985 | D10 | 1.710 | N10 | 1.5251 | V10 | 56.3 |
| R11 | −1.365 | D11 | 0.623 | N11 | | V11 | |
| R12 | 0.000 | D12 | 0.300 | N12 | 1.5163 | V12 | 64.1 |
| R13 | 0.000 | D13 | 0.275 | | | | |
| Example 12 | | | | | | |
| R1 | 20.273 | D1 | 1.200 | N1 | 1.6031 | V1 | 60.6 |
| R2 | 8.789 | D2 | 3.760 | N2 | | V2 | |
| R3 | 37.036 | D3 | 0.950 | N3 | 1.5251 | V3 | 56.3 |
| R4 | 6.341 | D4 | 2.793 | N4 | | V4 | |
| R5 | −11.579 | D5 | 0.907 | N5 | 1.5251 | V5 | 56.3 |
| R6 | 1.676 | D6 | 1.080 | N6 | | V6 | |
| R7 | 3.929 | D7 | 7.000 | N7 | 1.8467 | V7 | 23.8 |
| R8 | 2.620 | D8 | 0.100 | N8 | | V8 | |
| R9 | 1.217 | D9 | 2.426 | N9 | 1.5163 | V9 | 64.1 |
| R10 | −1.343 | D10 | 0.847 | N10 | | V10 | |
| R11 | 0.000 | D11 | 0.500 | N11 | 1.5163 | V11 | 64.1 |
| R12 | 0.000 | D12 | 1.030 | | | | |
| Example 13 | | | | | | |
| R1 | 23.029 | D1 | 1.200 | N1 | 1.6968 | V1 | 55.5 |
| R2 | 10.081 | D2 | 4.906 | N2 | | V2 | |
| R3 | 86.782 | D3 | 0.950 | N3 | 1.5251 | V3 | 56.3 |
| R4 | 4.296 | D4 | 2.724 | N4 | | V4 | |
| R5 | −11.332 | D5 | 0.850 | N5 | 1.5251 | V5 | 56.3 |
| R6 | 1.983 | D6 | 0.727 | N6 | | V6 | |
| R7 | 4.036 | D7 | 4.177 | N7 | 1.8467 | V7 | 23.8 |
| R8 | −27.917 | D8 | 1.652 | N8 | | V8 | |
| R9 | 0.000 | D9 | 0.700 | N9 | 1.8467 | V9 | 23.8 |
| R10 | 4.556 | D10 | 0.100 | N10 | | V10 | |
| R11 | 1.891 | D11 | 2.983 | N11 | 1.5917 | V11 | 60.6 |
| R12 | −1.669 | D12 | 0.815 | N12 | | V12 | |
| R13 | 0.000 | D13 | 0.500 | N13 | 1.5163 | | 64.1 |
| R14 | 0.000 | D14 | 1.030 | | | | |

Table 6 shows aspherical surface coefficients of the optical surface of each lens in Examples 10 to 13.

TABLE 6

| Surface | Conical Constant | A4 | A6 | A8 | A10 |
|---|---|---|---|---|---|
| Example 10 | | | | | |
| R1 | | | | | |
| R2 | −13.1716 | 5.920E−03 | −9.047E−06 | −2.882E−06 | 3.165E−09 |
| R3 | | | | | |
| R4 | −2.0764 | 1.029E−02 | 1.173E−03 | 1.466E−04 | −9.197E−07 |
| R5 | | | | | |
| R6 | −0.5703 | −3.261E−03 | −2.997E−03 | −3.647E−04 | 1.230E−04 |
| R7 | | | | | |
| R8 | | | | | |
| R9 | −0.8584 | −9.631E−02 | 5.708E−01 | −1.542E+00 | |
| R10 | −1.8216 | 1.697E−01 | 4.693E−02 | 4.896E−01 | |
| R11 | | | | | |
| R12 | | | | | |
| Example 11 | | | | | |
| R1 | | | | | |
| R2 | −1.8611 | 6.034E−03 | −2.982E−05 | −4.066E−06 | |
| R3 | | | | | |
| R4 | 0.0655 | 9.444E−03 | 2.192E−04 | 2.688E−04 | |
| R5 | | | | | |
| R6 | −0.2890 | 4.438E−03 | −5.356E−03 | −1.505E−03 | |
| R7 | 0.8734 | 1.268E−02 | 2.411E−03 | −1.368E−03 | |
| R8 | | | | | |
| R9 | | | | | |
| R10 | −1.0831 | −1.021E−02 | 2.070E−01 | −7.261E−01 | |
| R11 | −2.4427 | 1.265E−01 | 3.396E−01 | 1.159E−01 | |
| R12 | | | | | |
| R13 | | | | | |

TABLE 6-continued

| Surface | Conical Constant | A4 | A6 | A8 | A10 |
|---|---|---|---|---|---|
| Example 12 | | | | | |
| R1 | | | | | |
| R2 | | | | | |
| R3 | | 1.006E−05 | −9.094E−07 | −1.450E−08 | 4.520E−10 |
| R4 | 0.0909 | 2.870E−03 | −7.510E−06 | 7.866E−06 | −7.428E−07 |
| R5 | | −6.668E−04 | 1.684E−05 | 1.689E−06 | −7.958E−08 |
| R6 | −2.1245 | 1.453E−03 | 5.065E−04 | −6.029E−05 | −6.009E−06 |
| R7 | | | | | |
| R8 | | | | | |
| R9 | 1.1573 | −1.790E−01 | −1.381E−01 | −7.804E−02 | |
| R10 | 0.8995 | 4.363E−02 | 9.781E−03 | 1.891E−03 | 1.721E−02 |
| R11 | | | | | |
| R12 | | | | | |
| Example 13 | | | | | |
| R1 | | | | | |
| R2 | | | | | |
| R3 | | 7.050E−07 | 7.816E−08 | 3.559E−09 | −1.640E−12 |
| R4 | −0.7555 | 1.292E−03 | 4.341E−05 | 7.132E−06 | −9.406E−07 |
| R5 | | −9.344E−06 | −1.547E−06 | −9.425E−08 | −2.194E−08 |
| R6 | −1.4233 | −2.058E−03 | 5.929E−04 | 3.718E−05 | −2.401E−06 |
| R7 | | | | | |
| R8 | | | | | |
| R9 | | | | | |
| R10 | | | | | |
| R11 | 1.4511 | −7.684E−02 | 3.978E−02 | −4.413E−02 | |
| R12 | −0.7698 | 3.193E−02 | 3.816E−03 | −1.947E−03 | 2.280E−03 |
| R13 | | | | | |
| R14 | | | | | |

Table 7 show parameters R, D, N, and V of the optical apparatuses according to Examples 14 to 17 of the present invention.

TABLE 7

| Radius of Curvature | | Distance | | Refractive Index | | Abbe Number | |
|---|---|---|---|---|---|---|---|
| Example 14 | | | | | | | |
| R1 | 19.474 | D1 | 1.200 | N1 | 1.6968 | V1 | 55.5 |
| R2 | 9.066 | D2 | 3.814 | N2 | | V2 | |
| R3 | 34.716 | D3 | 0.950 | N3 | 1.5251 | V3 | 56.3 |
| R4 | 6.328 | D4 | 2.751 | N4 | | V4 | |
| R5 | −11.118 | D5 | 0.850 | N5 | 1.5251 | V5 | 56.3 |
| R6 | 1.597 | D6 | 0.800 | N6 | | V6 | |
| R7 | 2.900 | D7 | 7.000 | N7 | 1.6073 | V7 | 26.6 |
| R8 | 3.339 | D8 | 0.100 | N8 | | V8 | |
| R9 | 1.424 | D9 | 2.950 | N9 | 1.5251 | V9 | 56.3 |
| R10 | −1.575 | D10 | 0.690 | N10 | | V10 | |
| R11 | 0.000 | D11 | 0.500 | N11 | 1.5163 | V11 | 64.1 |
| R12 | 0.000 | D12 | 1.030 | | | | |
| Example 15 | | | | | | | |
| R1 | 15.458 | D1 | 0.800 | N1 | 1.5251 | V1 | 56.3 |
| R2 | 4.691 | D2 | 2.753 | N2 | | V2 | |
| R3 | 42.181 | D3 | 0.600 | N3 | 1.5251 | V3 | 56.3 |
| R4 | 1.519 | D4 | 1.620 | N4 | | V4 | |
| R5 | −25.338 | D5 | 0.700 | N5 | 1.5251 | V5 | 56.3 |
| R6 | 1.469 | D6 | 0.444 | N6 | | V6 | |
| R7 | 2.558 | D7 | 4.300 | N7 | 1.9068 | V7 | 21.2 |
| R8 | 8.657 | D8 | 0.239 | N8 | | V8 | |
| R9 | 0.000 | D9 | 0.050 | N9 | | V9 | |
| R10 | 0.891 | D10 | 1.151 | N10 | 1.5891 | V10 | 61.2 |
| R11 | −5.000 | D11 | 0.718 | N11 | | V11 | |
| R12 | 0.000 | D12 | 0.300 | N12 | 1.5163 | V12 | 64.1 |
| R13 | 0.000 | D13 | 0.275 | | | | |

TABLE 7-continued

| Radius of Curvature | | Distance | | Refractive Index | | Abbe Number | |
|---|---|---|---|---|---|---|---|
| Example 16 | | | | | | | |
| R1 | 16.801 | D1 | 0.800 | N1 | 1.5251 | V1 | 56.3 |
| R2 | 5.393 | D2 | 3.301 | N2 | | V2 | |
| R3 | 43.535 | D3 | 0.601 | N3 | 1.5251 | V3 | 56.3 |
| R4 | 1.414 | D4 | 1.493 | N4 | | V4 | |
| R5 | −9.426 | D5 | 0.698 | N5 | 1.5251 | V5 | 56.3 |
| R6 | 1.585 | D6 | 0.268 | N6 | | V6 | |
| R7 | 2.468 | D7 | 2.500 | N7 | 1.9068 | V7 | 21.2 |
| R8 | 3.642 | D8 | 0.073 | N8 | | V8 | |
| R9 | 0.000 | D9 | 0.050 | N9 | | V9 | |
| R10 | 0.948 | D10 | 1.581 | N10 | 1.5891 | V10 | 61.2 |
| R11 | −1.179 | D11 | 0.687 | N11 | | V11 | |
| R12 | 0.000 | D12 | 0.300 | N12 | 1.5163 | V12 | 64.1 |
| R13 | 0.000 | D13 | 0.275 | | | | |
| Example 17 | | | | | | | |
| R1 | 13.247 | D1 | 0.700 | N1 | 1.5251 | V1 | 56.3 |
| R2 | 4.175 | D2 | 2.505 | N2 | | V2 | |
| R3 | −198.488 | D3 | 0.500 | N3 | 1.5251 | V3 | 56.3 |
| R4 | 3.255 | D4 | 1.106 | N4 | | V4 | |
| R5 | −23.213 | D5 | 0.600 | N5 | 1.5251 | V5 | 56.3 |
| R6 | 1.556 | D6 | 0.610 | N6 | | V6 | |
| R7 | 2.506 | D7 | 5.288 | N7 | 1.6073 | V7 | 26.6 |
| R8 | 2.898 | D8 | 0.050 | N8 | | V8 | |
| R9 | 0.000 | D9 | 0.050 | N9 | | V9 | |
| R10 | 0.894 | D10 | 1.930 | N10 | 1.5251 | V10 | 56.3 |
| R11 | −1.095 | D11 | 0.609 | N11 | | V11 | |
| R12 | 0.000 | D12 | 0.300 | N12 | 1.5163 | V12 | 64.1 |
| R13 | 0.000 | D13 | 0.275 | | | | |

Table 8 shows aspherical surface coefficients of the optical surface of each lens in Examples 14 to 17.

TABLE 8

| Surface | Conical Constant | A4 | A6 | A8 | A10 |
|---|---|---|---|---|---|
| | | | Example 14 | | |
| R1 | | | | | |
| R2 | | | | | |
| R3 | | 4.831E−06 | −1.233E−06 | −1.587E−08 | 3.807E−10 |
| R4 | 0.4688 | 2.418E−03 | −3.278E−06 | 7.911E−06 | −7.313E−07 |
| R5 | | −7.884E−04 | 2.450E−05 | 2.063E−06 | −9.015E−08 |
| R6 | −1.8539 | 1.912E−03 | 5.560E−04 | −6.488E−05 | 6.014E−06 |
| R7 | −0.1979 | 6.338E−04 | −2.622E−04 | −9.766E−06 | |
| R8 | −11.7536 | 2.705E−02 | 3.756E−02 | −1.338E−02 | |
| R9 | 1.3483 | −1.118E−01 | −1.379E−01 | 1.929E−01 | |
| R10 | −0.9363 | 5.198E−02 | 1.666E−02 | −8.647E−03 | 7.173E−03 |
| R11 | | | | | |
| R12 | | | | | |
| | | | Example 15 | | |
| R1 | | | | | |
| R2 | −3.6673 | 5.912E−03 | −1.212E−05 | −3.094E−06 | 2.243E−09 |
| R3 | | | | | |
| R4 | −1.8884 | 1.686E−02 | 2.943E−03 | 9.396E−05 | −1.017E−04 |
| R5 | | | | | |
| R6 | −0.4719 | 1.215E−02 | −2.910E−03 | 4.902E−04 | −2.838E−04 |
| R7 | | | | | |
| R8 | | | | | |
| R9 | | | | | |
| R10 | −0.5381 | −3.476E−02 | 3.167E−01 | −5.421E−01 | |
| R11 | −154.8999 | 3.382E−01 | −5.465E−02 | 2.429E+00 | |
| R12 | | | | | |
| R13 | | | | | |
| | | | Example 16 | | |
| R1 | | | | | |
| R2 | −7.8623 | 5.899E−03 | −7.473E−06 | −3.025E−06 | 7.785E−09 |
| R3 | | | | | |
| R4 | −1.8730 | 1.628E−02 | 2.574E−03 | 2.187E−04 | −3.271E−05 |
| R5 | | | | | |
| R6 | −0.6373 | −1.003E−02 | −5.635E−03 | 3.955E−04 | −3.950E−04 |
| R7 | | | | | |
| R8 | | | | | |
| R9 | | | | | |
| R10 | −0.9224 | −1.172E−01 | 5.039E−01 | −8.753E−01 | |
| R11 | −1.9673 | 2.020E−01 | −1.685E−01 | 7.978E−01 | |
| R12 | | | | | |
| R13 | | | | | |
| | | | Example 17 | | |
| R1 | | | | | |
| R2 | −1.5263 | 6.589E−03 | −7.344E−06 | −2.670E−06 | |
| R3 | | | | | |
| R4 | −1.1182 | −6.208E−05 | 2.085E−03 | 4.408E−04 | |
| R5 | | | | | |
| R6 | −0.3514 | 6.067E−03 | −6.624E−03 | −2.912E−03 | |
| R7 | 0.6235 | 1.863E−02 | 8.991E−04 | −2.315E−03 | |
| R8 | | | | | |
| R9 | | | | | |
| R10 | −1.1895 | −3.684E−02 | 6.295E−01 | −2.398E+00 | |
| R11 | −1.7533 | 2.755E−01 | −2.455E−01 | 9.175E−01 | |
| R12 | | | | | |
| R13 | | | | | |

Table 9 show parameters R, D, N, and V of the optical apparatuses according to Examples 18 to 21 of the present invention.

FIG. 12 shows an optical apparatus according to Example 18, FIG. 13(A) shows a graph of astigmatism according to Example 18, and FIG. 13(B) shows a graph of distortion according to Example 18. FIG. 14 shows an optical apparatus according to Example 21, FIG. 15(A) shows a graph of astigmatism according to Example 21, and FIG. 15(B) shows a graph of distortion according to Example 21.

TABLE 9

| | Radius of Curvature | | Distance | Refractive Index | | Abbe Number |
|---|---|---|---|---|---|---|
| | | | Example 18 | | | |
| R1 | 16.024 | D1 | 0.800 | N1 | 1.5251 | V1 | 56.3 |
| R2 | 9.741 | D2 | 2.692 | N2 | | V2 | |
| R3 | 95.870 | D3 | 0.600 | N3 | 1.5251 | V3 | 56.3 |
| R4 | 2.075 | D4 | 1.711 | N4 | | V4 | |
| R5 | −12.586 | D5 | 0.700 | N5 | 1.5251 | V5 | 56.3 |
| R6 | 1.583 | D6 | 0.315 | N6 | | V6 | |
| R7 | 2.577 | D7 | 3.003 | N7 | 1.9068 | V7 | 21.2 |
| R8 | 4.131 | D8 | 1.500 | N8 | | V8 | |
| R9 | 0.000 | D9 | 0.050 | N9 | | V9 | |
| R10 | 1.141 | D10 | 2.047 | N10 | 1.5891 | V10 | 61.2 |
| R11 | −1.169 | D11 | 0.500 | N11 | | V11 | |
| R12 | 0.000 | D12 | 0.300 | N12 | 1.5163 | V12 | 64.1 |
| R13 | 0.000 | D13 | 0.275 | | | | |
| | | | Example 19 | | | |
| R1 | 2.683 | D1 | 0.700 | N1 | 1.5251 | V1 | 56.3 |
| R2 | 0.793 | D2 | 0.814 | N2 | | V2 | |
| R3 | 1.329 | D3 | 1.630 | N3 | 1.6073 | V3 | 26.6 |
| R4 | 1.652 | D4 | 0.668 | N4 | | V4 | |
| R5 | 0.000 | D5 | 0.500 | N5 | | V5 | |
| R6 | 1.460 | D6 | 2.347 | N6 | 1.5251 | V6 | 56.3 |
| R7 | −0.716 | D7 | 0.500 | N7 | | V7 | |
| R8 | 0.000 | D8 | 0.300 | N8 | 1.5163 | V8 | 64.1 |
| R9 | 0.000 | D9 | 0.275 | | | | |
| | | | Example 20 | | | |
| R1 | 5.310 | D1 | 0.700 | N1 | 1.5251 | V1 | 56.3 |
| R2 | 4.048 | D2 | 2.055 | N2 | | V2 | |
| R3 | −8.022 | D3 | 0.700 | N3 | 1.5251 | V3 | 56.3 |
| R4 | 1.274 | D4 | 0.595 | N4 | | V4 | |
| R5 | 2.075 | D5 | 4.457 | N5 | 1.6073 | V5 | 26.6 |
| R6 | 2.898 | D6 | 0.202 | N6 | | V6 | |
| R7 | 0.000 | D7 | 0.400 | N7 | | V7 | |
| R8 | 1.402 | D8 | 2.424 | N8 | 1.5251 | V8 | 56.3 |
| R9 | −0.875 | D9 | 0.809 | N9 | | V9 | |
| R10 | 0.000 | D10 | 0.300 | N10 | 1.5891 | V10 | 61.2 |
| R11 | 0.000 | D11 | 0.275 | N11 | | V11 | |
| | | | Example 21 | | | |
| R1 | 17.615 | D1 | 0.800 | N1 | 1.5251 | V1 | 56.3 |
| R2 | 9.062 | D2 | 2.710 | N2 | | V2 | |
| R3 | 54.535 | D3 | 0.600 | N3 | 1.5251 | V3 | 56.3 |
| R4 | 1.801 | D4 | 1.650 | N4 | | V4 | |
| R5 | −13.067 | D5 | 0.700 | N5 | 1.5251 | V5 | 56.3 |
| R6 | 1.636 | D6 | 0.241 | N6 | | V6 | |
| R7 | 2.561 | D7 | 5.140 | N7 | 1.9068 | V7 | 21.2 |
| R8 | 21.995 | D8 | 0.147 | N8 | | V8 | |
| R9 | 0.000 | D9 | 0.700 | N9 | | V9 | |
| R10 | 1.787 | D10 | 2.372 | N10 | 1.5891 | V10 | 61.2 |
| R11 | −0.834 | D11 | 0.500 | N11 | | V11 | |
| R12 | 0.000 | D12 | 0.300 | N12 | 1.5163 | V12 | 64.1 |
| R13 | 0.000 | D13 | 0.275 | | | | |

Table 10 shows aspherical surface coefficients of the optical surface of each lens in Examples 18 to 21.

TABLE 10

| Surface | Conical Constant | A4 | A6 | A8 | A10 |
|---|---|---|---|---|---|
| | | Example 18 | | | |
| R1 | | | | | |
| R2 | −3.2769 | 5.222E−03 | −2.316E−05 | −2.582E−06 | 5.506E−08 |
| R3 | | | | | |
| R4 | −5.2253 | 2.786E−03 | 1.632E−03 | 1.544E−04 | −3.246E−05 |
| R5 | | | | | |
| R6 | −0.6251 | −1.620E−02 | −3.543E−03 | 1.214E−03 | −9.270E−05 |
| R7 | | | | | |
| R8 | | | | | |
| R9 | | | | | |
| R10 | −0.5508 | −6.853E−02 | 2.573E−01 | −4.854E−01 | |
| R11 | −4.1447 | 1.545E−01 | −2.089E−01 | 6.974E−01 | |
| R12 | | | | | |
| R13 | | | | | |
| | | Example 19 | | | |
| R1 | | −5.530E−02 | −9.938E−04 | 1.680E−03 | −2.128E−04 |
| R2 | −0.7479 | 2.893E−01 | −2.182E−01 | −2.124E−02 | 1.118E−02 |
| R3 | −0.0703 | 2.037E−01 | −2.505E−01 | 2.143E−01 | −8.986E−02 |
| R4 | | | | | |
| R5 | | | | | |
| R6 | 0.6717 | −7.013E−02 | 6.535E−02 | −1.073E−01 | |
| R7 | −2.0091 | −8.487E−03 | 6.794E−02 | −2.812E−02 | 6.274E−02 |
| R8 | | | | | |
| R9 | | | | | |
| | | Example 20 | | | |
| R1 | | −7.105E−03 | 1.962E−04 | 1.277E−06 | −1.423E−07 |
| R2 | | | | | |
| R3 | | | | | |
| R4 | −1.1252 | 2.963E−02 | −4.267E−03 | −4.110E−04 | |
| R5 | −0.1750 | 3.929E−02 | −8.948E−03 | −3.234E−05 | |
| R6 | | | | | |
| R7 | | | | | |
| R8 | −1.8886 | 3.033E−02 | 3.322E−03 | −1.605E−02 | 9.577E−03 |
| R9 | −3.4541 | −1.654E−01 | 1.743E−01 | −2.653E−02 | 2.574E−03 |
| R10 | | | | | |
| R11 | | | | | |
| | | Example 21 | | | |
| R1 | | | | | |
| R2 | −8.4800 | 6.441E−03 | −4.867E−06 | −2.993E−06 | 1.979E−08 |
| R3 | | | | | |
| R4 | −3.3533 | 7.140E−03 | 4.873E−03 | 2.212E−04 | −9.288E−05 |
| R5 | | | | | |
| R6 | −0.7037 | −1.643E−02 | −1.625E−03 | 1.488E−03 | −1.353E−04 |
| R7 | | | | | |
| R8 | | | | | |
| R9 | | | | | |
| R10 | −2.9115 | −1.167E−02 | 7.251E−02 | −3.240E−02 | |
| R11 | −2.6448 | −1.934E−02 | 2.737E−03 | 2.761E−02 | |
| R12 | | | | | |
| R13 | | | | | |

Table 11 shows the relationships between the focal lengths and conditions of the optical apparatuses according to Examples 1 to 21.

TABLE 11

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| | | | | | | Projection Method | | | | | |
| | Central | Central | Stereo-graphic | Conformal | Stereo-graphic | Conformal | Conformal | Conformal | Stereo-graphic | Stereo-graphic | Stereo-graphic |
| | | | | | Horizontal Angle of View | | | | | | |
| | 90.0 | 90.0 | 90.0 | 130.0 | 130.0 | 190.0 | 190.0 | 190.0 | 190.0 | 190.0 | 190.0 |
| Fno | 2.45 | 2.93 | 2.85 | 2.80 | 2.85 | 2.14 | 2.20 | 3.26 | 2.16 | 2.87 | 2.90 |
| f | 1.04 | 1.04 | 1.24 | 0.95 | 0.83 | 0.63 | 0.68 | 0.68 | 0.48 | 0.48 | 0.49 |
| f1 | −1.70 | −2.12 | −1.91 | −3.17 | −1.72 | −1.16 | −1.18 | −1.11 | −0.80 | −0.81 | −0.98 |
| f2 | 5.59 | 6.02 | 5.63 | −52.22 | 5.03 | 4.22 | 3.13 | 3.61 | 3.12 | 2.69 | 4.41 |
| f3 | 2.42 | 1.52 | 1.71 | 1.27 | 1.50 | 1.28 | 1.47 | 1.39 | 1.25 | 1.28 | 1.45 |
| f12 | −1.27 | −1.99 | −2.03 | −1.05 | −1.24 | −1.18 | −1.54 | −1.56 | −0.84 | −1.29 | −1.37 |
| f23 | 4.59 | 3.31 | 3.02 | 3.57 | 5.33 | 2.81 | 5.97 | 2.66 | 3.59 | 4.09 | 3.07 |
| f1/f | −1.64 | −2.03 | −1.54 | −3.34 | −2.06 | −1.82 | −1.73 | −1.64 | −1.66 | −1.68 | −2.01 |
| f2/f | 5.37 | 5.78 | 4.55 | −54.93 | 6.05 | 6.64 | 4.60 | 5.32 | 6.49 | 5.60 | 9.00 |
| f3/f | 2.33 | 1.46 | 1.38 | 1.34 | 1.80 | 2.02 | 2.15 | 2.05 | 2.61 | 2.67 | 2.96 |
| f12/f | −1.22 | −1.92 | −1.64 | −1.10 | −1.50 | −1.86 | −2.26 | −2.30 | −1.75 | −2.68 | −2.79 |
| f12/f3 | −0.52 | −1.31 | −1.19 | −0.82 | −0.83 | −0.92 | −1.05 | −1.12 | −0.67 | −1.01 | −0.94 |
| t2 | 4.50 | 1.42 | 2.62 | 3.71 | 4.30 | 3.00 | 2.67 | 2.00 | 4.30 | 4.05 | 4.43 |
| t2S | 0.10 | 0.29 | 0.05 | 0.46 | 0.05 | 0.10 | 0.05 | 0.26 | 0.05 | 0.00 | 0.05 |
| tS | 0.00 | 0.00 | 0.05 | 0.05 | 0.05 | 0.00 | 0.05 | 0.05 | 0.05 | 0.10 | 0.05 |
| L | 9.86 | 5.73 | 6.07 | 11.49 | 10.51 | 10.46 | 9.59 | 9.07 | 12.60 | 12.40 | 12.17 |
| t2/L | 0.46 | 0.25 | 0.43 | 0.32 | 0.41 | 0.29 | 0.28 | 0.22 | 0.34 | 0.33 | 0.36 |
| t2S/L | 0.01 | 0.05 | 0.01 | 0.04 | 0.00 | 0.01 | 0.01 | 0.03 | 0.00 | 0.00 | 0.00 |
| tS/L | 0.00 | 0.00 | 0.01 | 0.00 | 0.00 | 0.00 | 0.01 | 0.01 | 0.00 | 0.01 | 0.00 |
| θs | 27.20 | 35.90 | 29.70 | 35.00 | 36.30 | 32.30 | 30.20 | 29.40 | 31.70 | 33.20 | 27.90 |

| | No. | | | | | | | | | |
|---|---|---|---|---|---|---|---|---|---|---|
| | 12 | 13 | 14 | 15 | 16 | 17 | 18 | 19 | 20 | 21 |
| | | | | | Projection Method | | | | | |
| | Stereo-graphic | Stereo-graphic | Stereo-graphic | Stereo-graphic | Stereo-graphic | Stereo-graphic | Stereo-graphic | Central | Stereo-graphic | Stereo-graphic |
| | | | | Horizontal Angle of View | | | | | | |
| | 190.0 | 190.0 | 190.0 | 190.0 | 190.0 | 190.0 | 190.0 | 90.0 | 130.0 | 190.0 |
| Fno | 2.88 | 2.85 | 2.89 | 2.24 | 2.19 | 2.90 | 2.19 | 3.25 | 2.84 | 2.18 |
| f | 0.80 | 0.80 | 0.80 | 0.48 | 0.48 | 0.49 | 0.47 | 1.04 | 0.82 | 0.48 |
| f1 | −1.49 | −1.37 | −1.42 | −0.75 | −0.73 | −1.13 | −1.11 | −2.45 | −1.90 | −1.03 |
| f2 | 6.29 | 4.63 | 5.12 | 2.97 | 4.14 | 4.95 | 3.89 | 3.80 | 3.90 | 2.81 |
| f3 | 1.82 | 2.17 | 2.99 | 1.38 | 1.23 | 1.40 | 1.46 | 1.45 | 1.61 | 1.45 |
| f12 | −0.88 | −1.34 | −1.18 | −1.45 | −0.85 | −0.95 | −1.40 | −4.26 | −2.07 | −2.79 |
| f23 | 6.64 | 11.05 | 10.08 | 2.63 | 1.93 | 4.84 | 8.32 | 8.24 | 34.26 | 5.00 |
| f1/f | −1.85 | −1.71 | −1.77 | −1.56 | −1.52 | −2.31 | −2.30 | −2.35 | −2.31 | −2.15 |
| f2/f | 7.84 | 5.77 | 6.37 | 6.16 | 8.59 | 10.10 | 8.09 | 3.65 | 4.73 | 5.85 |
| f3/f | 2.27 | 2.71 | 3.72 | 2.87 | 2.55 | 2.86 | 3.03 | 1.40 | 1.96 | 3.02 |
| f12/f | −1.10 | −1.68 | −1.47 | −3.01 | −1.76 | −1.94 | −2.92 | −4.09 | −2.51 | −5.81 |
| f12/f3 | −0.48 | −0.62 | −0.40 | −1.05 | −0.69 | −0.68 | −0.96 | −2.93 | −1.28 | −1.93 |
| t2 | 7.00 | 6.53 | 7.00 | 4.30 | 2.50 | 5.29 | 3.00 | 1.63 | 4.46 | 5.14 |
| t2S | 0.10 | 0.10 | 0.10 | 0.24 | 0.07 | 0.05 | 1.50 | 0.67 | 0.20 | 0.15 |
| tS | 0.00 | 0.80 | 0.05 | 0.05 | 0.05 | 0.05 | 0.05 | 0.50 | 0.40 | 0.70 |
| L | 20.22 | 20.97 | 20.41 | 12.66 | 11.36 | 13.34 | 13.42 | 6.66 | 11.53 | 15.06 |
| t2/L | 0.35 | 0.31 | 0.34 | 0.34 | 0.22 | 0.40 | 0.22 | 0.24 | 0.39 | 0.34 |
| t2S/L | 0.00 | 0.00 | 0.00 | 0.02 | 0.01 | 0.00 | 0.11 | 0.10 | 0.02 | 0.01 |
| tS/L | 0.00 | 0.04 | 0.00 | 0.00 | 0.00 | 0.00 | 0.00 | 0.08 | 0.03 | 0.05 |
| θs | 33.60 | 35.50 | 28.90 | 28.60 | 32.00 | 27.50 | 28.50 | 36.50 | 35.80 | 33.50 |

REFERENCE NUMERALS

Figure 1:
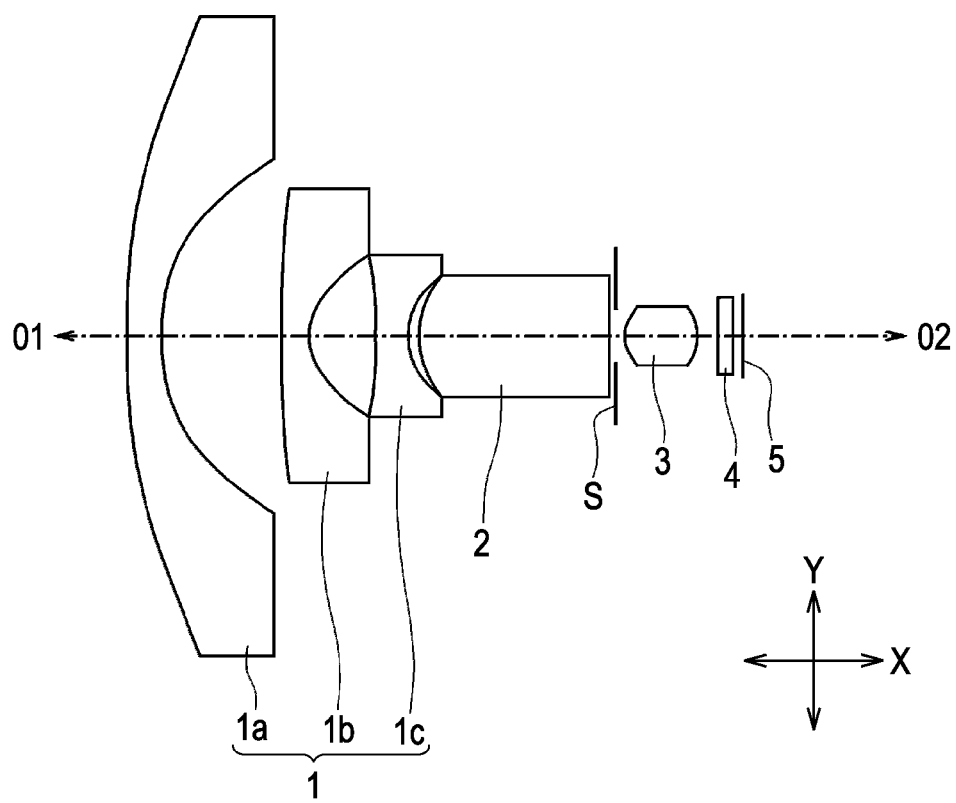
FIG. 1 is a sectional view illustrating an optical apparatus according to an embodiment of the present invention.
Figure 2:
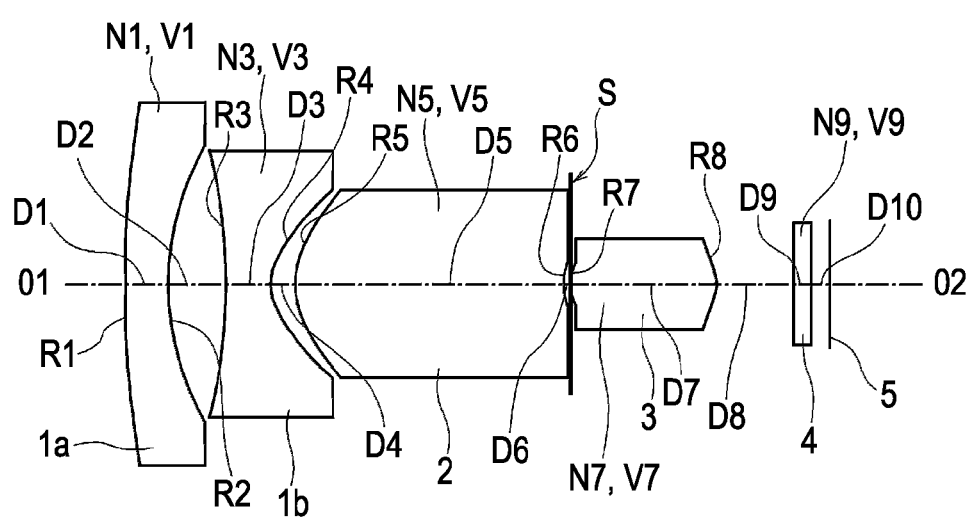
FIG. 2 is an optical sectional view of Example 1.
Figure 3:
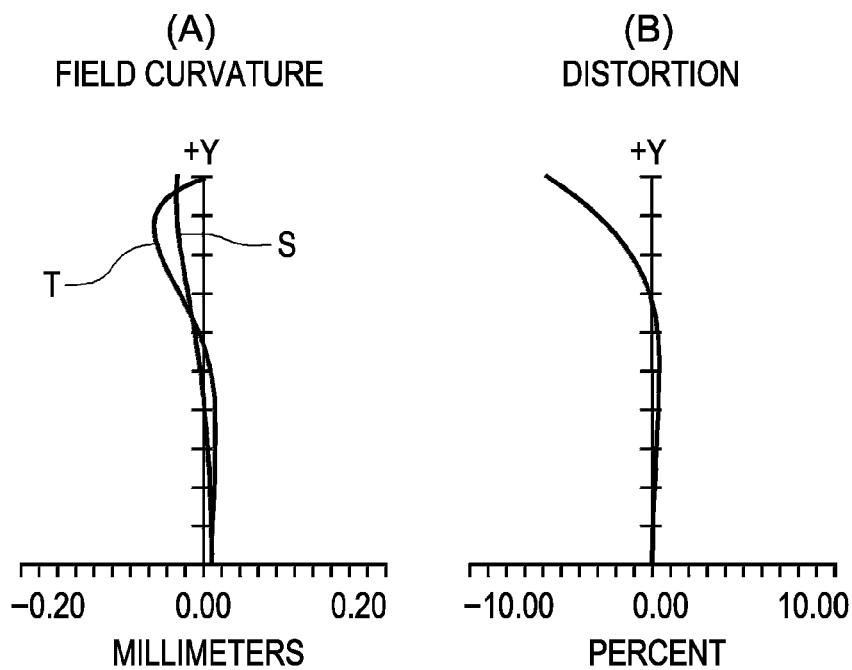
FIGS. 3(A) and 3(B) are image-height (astigmatism and distortion) aberration diagrams of Example 1.
Figure 4:
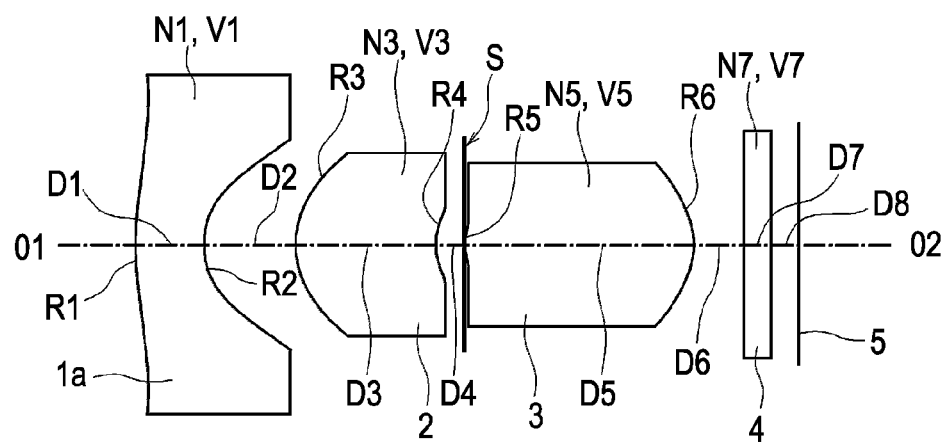
FIG. 4 is an optical sectional view of Example 2.
Figure 5:
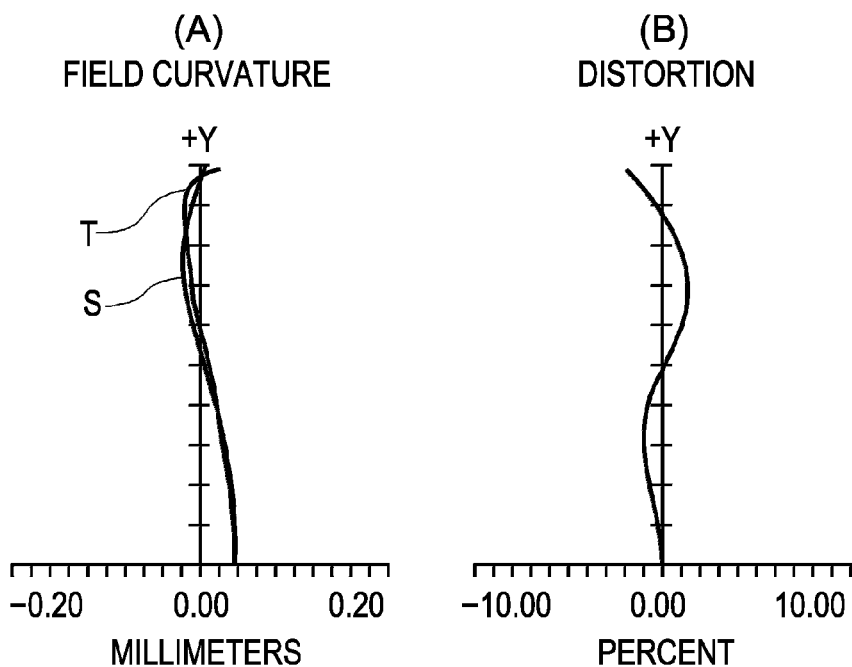
FIGS. 5(A) and 5(B) are image-height aberration diagrams of Example 2.
Figure 6:
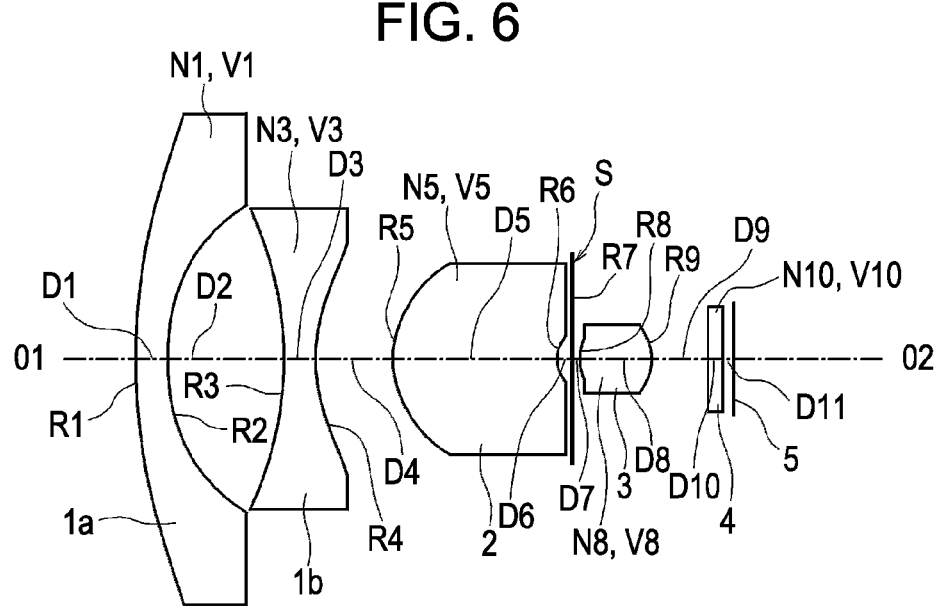
FIG. 6 is an optical sectional view of Example 4.
Figure 7:
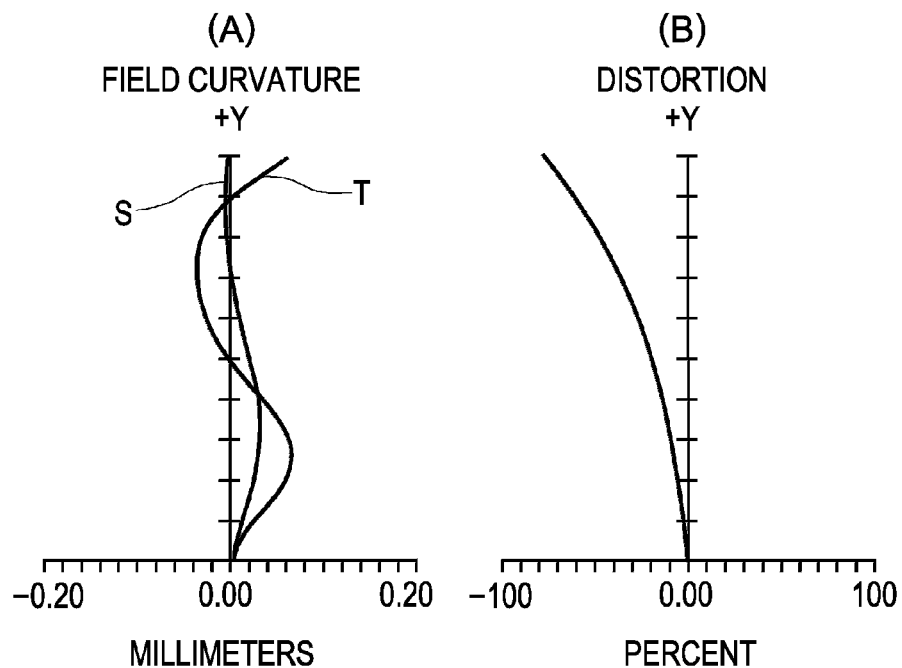
FIGS. 7(A) and 7(B) are image-height aberration diagrams of Example 4.
Figure 8:
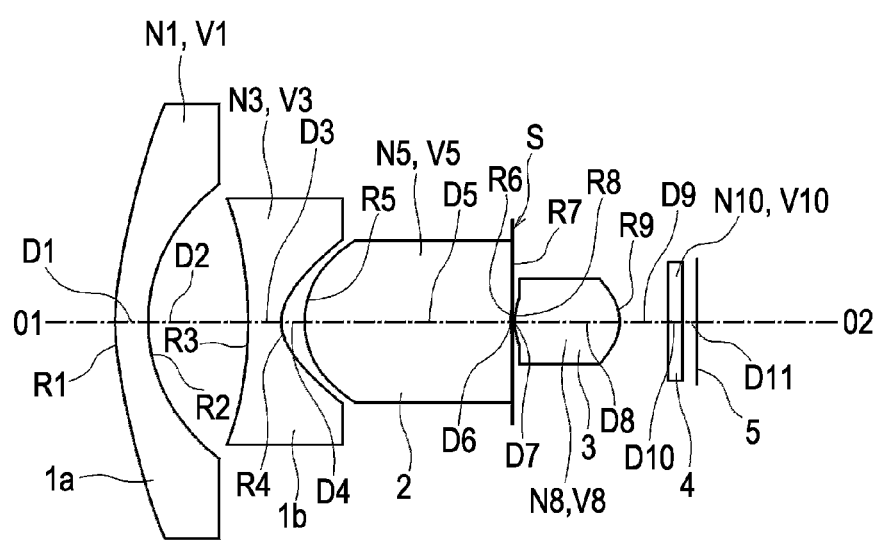
FIG. 8 is an optical sectional view of Example 5.
Figure 9:
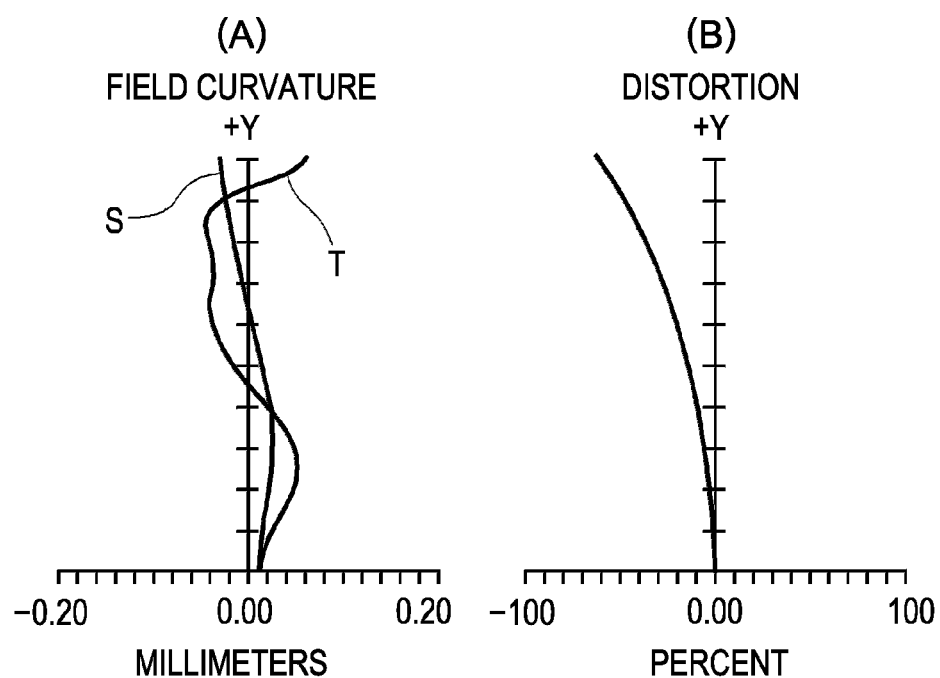
FIGS. 9(A) and 9(B) are image-height aberration diagrams of Example 5.
Figure 10:
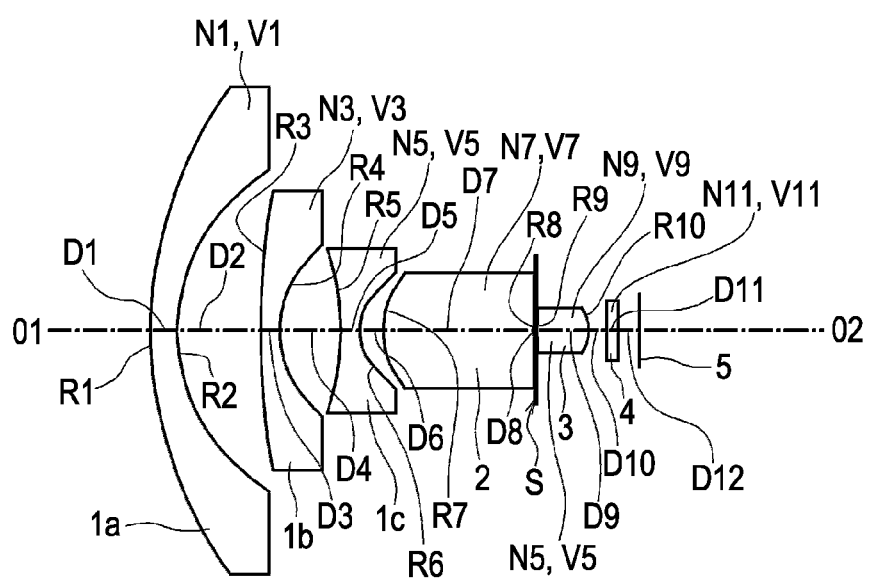
FIG. 10 is an optical sectional view of Example 12.
Figure 11:
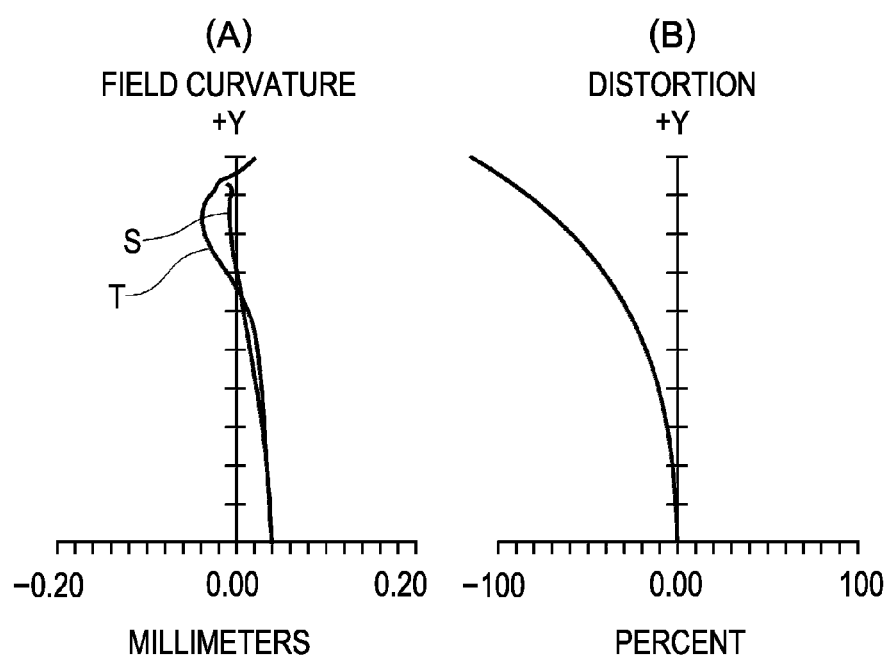
FIGS. 11(A) and 11(B) are image-height aberration diagrams of Example 12.
Figure 12:
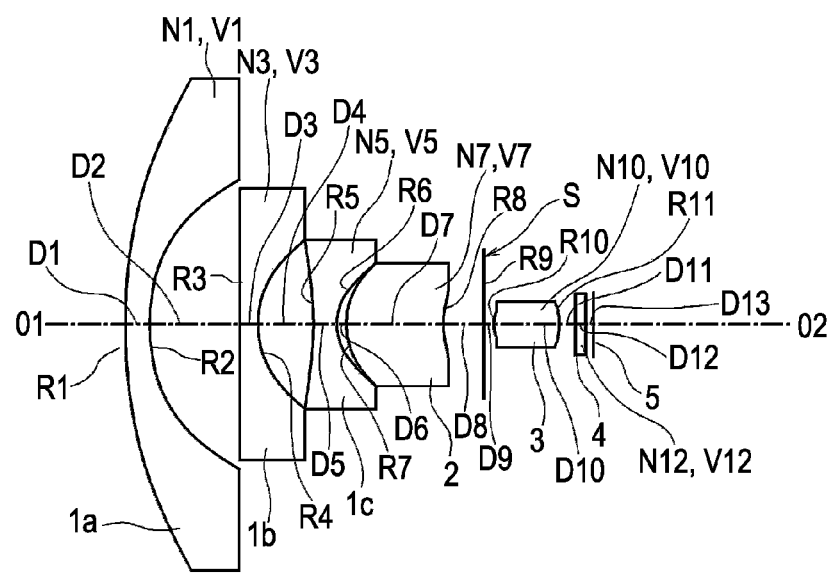
FIG. 12 is an optical sectional view of Example 18.
Figure 13:
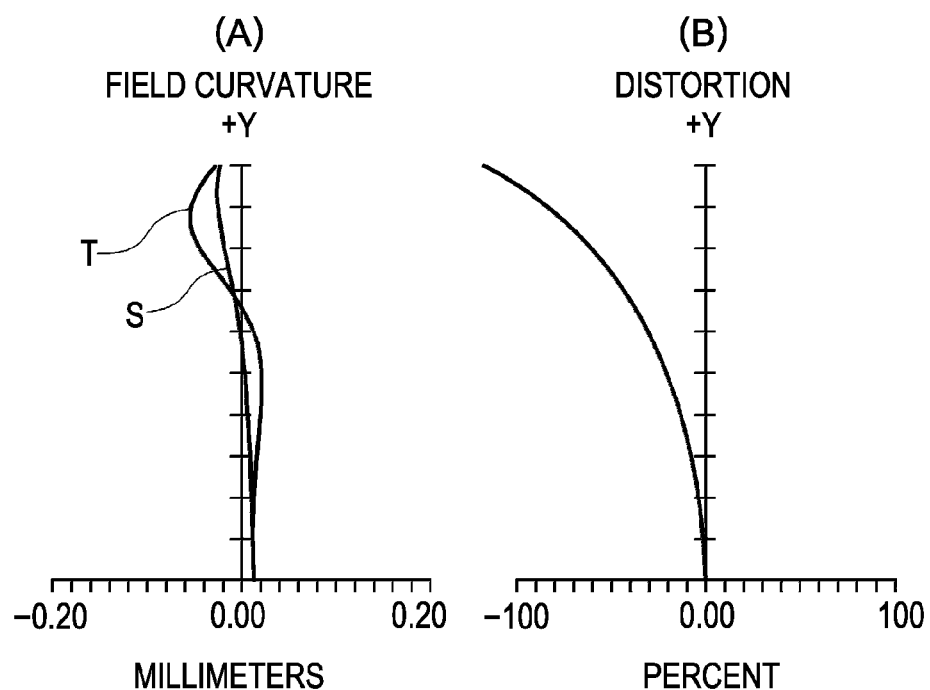
FIGS. 13(A) and 13(B) are image-height aberration diagrams of Example 18.
Figure 14:
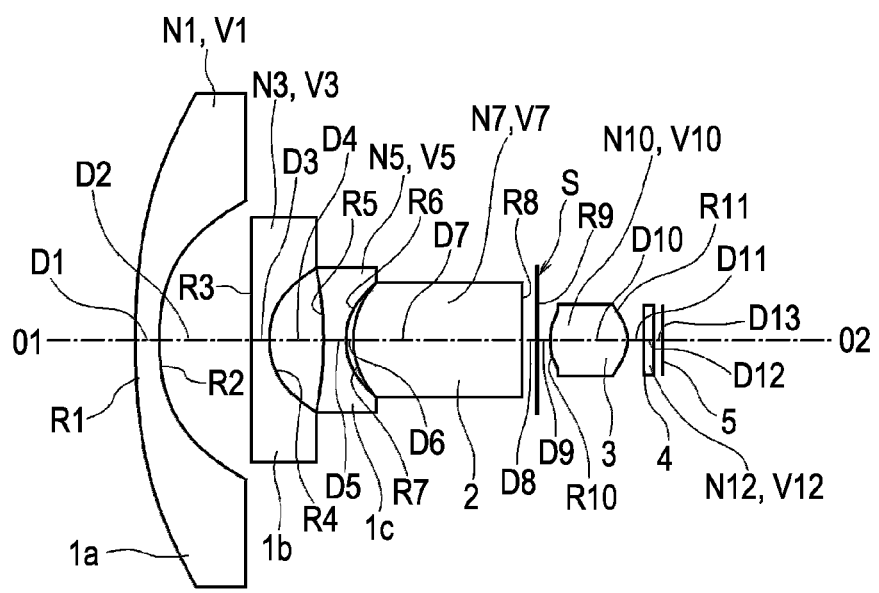
FIG. 14 is an optical sectional view of Example 21.
Figure 15:
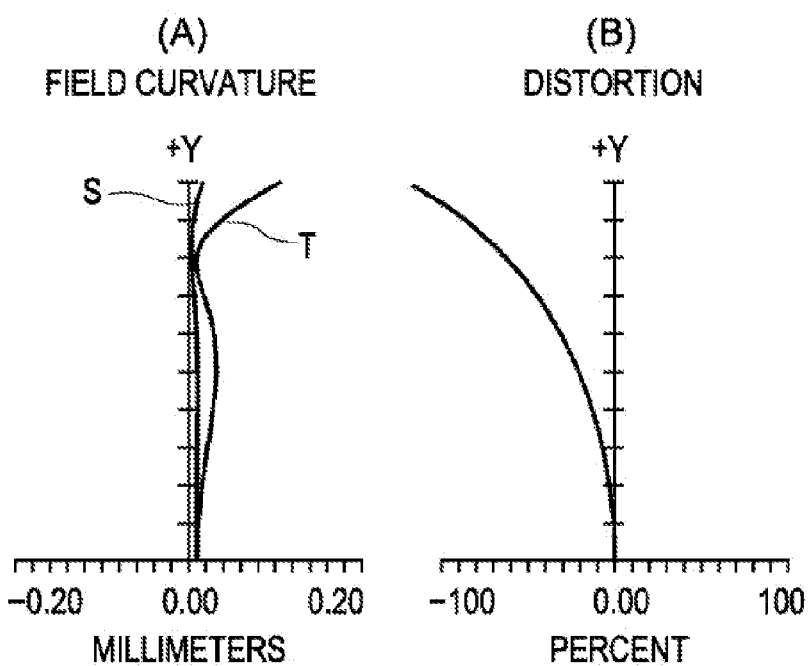
FIGS. 15(A) and 15(B) are image-height aberration diagrams of Example 21.
Figure 16:
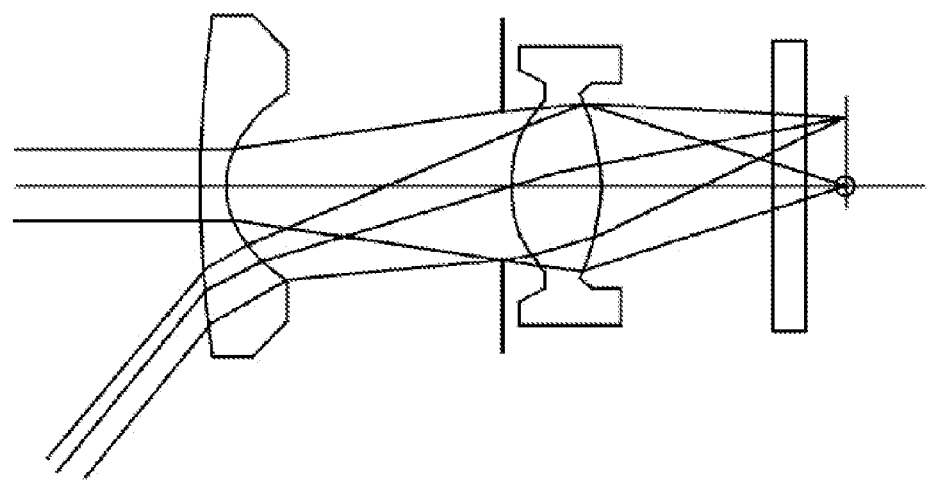
FIG. 16 is a diagram illustrating a known technique.
Figure 17:
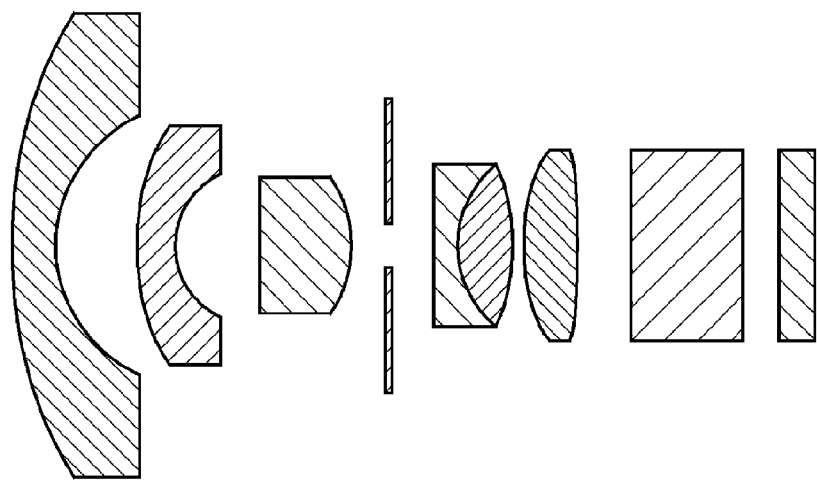
FIG. 17 is another diagram illustrating a known technique.
Figure 18:
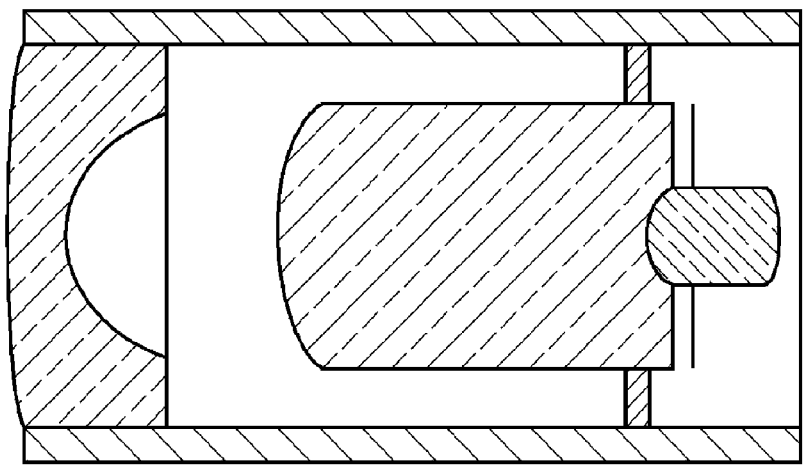
FIG. 18 is another diagram illustrating a known technique.

S aperture stop
1 negative lens unit
2 meniscus lens
3 double-convex positive lens
4 cover glass
5 image pickup device

The invention claimed is:

1. An optical apparatus comprising at least one negative lens, a meniscus lens that is convex on an object side, an aperture stop, and a double-convex positive lens arranged from the object side to an image side, wherein at least one of the lenses positioned on the object side of the aperture stop and the positive lens include respective aspherical surfaces, and wherein, when va is an average Abbe number of all of the lenses excluding the meniscus lens, vb is an Abbe number of the meniscus lens, f is a focal length of the entire system, f12 is a combined focal length of the negative lens unit and the meniscus lens, ts is a distance between the aperture stop and the positive lens along an axis, L is a distance between a vertex of a lens surface nearest to the object side and a vertex of a lens surface nearest to the image side, t2 is a central thickness of the meniscus lens, θs is an incident angle of a chief ray that passes through the aperture stop at a maximum angle of view, the following Expression 1 is satisfied:

$1.4 < va/vb;$ $0 < ts/L < 0.1$ $0.2 < t2/L < 0.5;$ $-10 < f12/f < -1.0;$ and $25° < θs < 40°$ [Expression 1].

2. An optical apparatus comprising at least one negative lens, a positive meniscus lens that is convex on an object side, an aperture stop, and a double-convex positive lens arranged from the object side to an image side, wherein at least one of the lenses positioned on the object side of the aperture stop and the positive lens include respective aspherical surfaces, wherein an amount of correction of sagittal field curvature by the lenses positioned on the object side of the aperture stop is larger than an amount of correction of sagittal field curvature by the positive lens, and wherein, when va is an average Abbe number of all of the lenses excluding the meniscus lens, vb is an Abbe number of the meniscus lens, L is a distance between a vertex of a lens surface nearest to the object side and a vertex of a lens surface nearest to the image side, ts is a distance between the aperture stop and the double-convex lens, and t2 is a central thickness of the meniscus lens, the following Expression 2 is satisfied:

$1.4 < va/vb;$ $0 < ts/L < 0.1;$ and $0.2 < t2/L < 0.5$ [Expression 2].

3. The optical apparatus according to claim 1, wherein the optical apparatus comprises a single negative lens, the meniscus lens that is convex on the object side, the aperture stop, and the double-convex positive lens arranged from the object side to the image side, and wherein the optical apparatus is capable of performing central projection of an object space within an angle of field of 80 degrees or more toward the object side onto an image pickup device.

4. The optical apparatus according to claim 1, wherein the optical apparatus comprises two negative lenses, the meniscus lens that is convex on the object side, the aperture stop, and the double-convex positive lens arranged from the object side to the image side, and wherein the optical apparatus is capable of performing stereographic projection of an object space within an angle of field of 120 degrees or more toward the object side onto an image pickup device.

5. The optical apparatus according to claim 1, wherein the optical apparatus comprises three negative lenses, the meniscus lens that is convex on the object side, the aperture stop, and the double-convex positive lens arranged from the object side to the image side, and wherein the optical apparatus is capable of performing stereographic projection of an object space within an angle of field of 180 degrees or more toward the object side onto an image pickup device.

6. The optical apparatus according to claim 1, wherein the positive lens has aspherical surfaces on either side thereof.

7. The optical apparatus according to claim 1, wherein the negative lens nearest to the object side is a glass spherical lens.

8. The optical apparatus according to claim 1, wherein the positive lens is a glass aspherical lens.

9. The optical apparatus according to claim 1, wherein all of the lenses are composed of resin.

10. The optical apparatus according to claim 1, wherein the meniscus lens consists of two separate lenses.

* * * * *